(12) United States Patent
Washburn, III et al.

(10) Patent No.: US 10,690,431 B2
(45) Date of Patent: Jun. 23, 2020

(54) MONOLITHIC NOISE SUPPRESSION DEVICE WITH PURPOSELY INDUCED POROSITY FOR FIREARM

(71) Applicant: Centre Firearms Co., Inc., Ridgewood, NY (US)

(72) Inventors: Richard Ryder Washburn, III, Ridgewood, NY (US); Michael Berkeypile, Ridgewood, NY (US); Richard Ryder Washburn, II, Ridgewood, NY (US)

(73) Assignee: CENTRE FIREARMS CO., INC., Ridgewood, NY (US)

( * ) Notice: Subject to any disclaimer, the term of this patent is extended or adjusted under 35 U.S.C. 154(b) by 37 days.

(21) Appl. No.: 16/120,491

(22) Filed: Sep. 4, 2018

(65) Prior Publication Data
US 2020/0072571 A1      Mar. 5, 2020

(51) Int. Cl.
*F41A 21/30*      (2006.01)
*B33Y 80/00*      (2015.01)

(52) U.S. Cl.
CPC ............... *F41A 21/30* (2013.01); *B33Y 80/00* (2014.12)

(58) Field of Classification Search
CPC ................................ F41A 21/30; B33Y 80/00
USPC ........................................................... 181/223
See application file for complete search history.

(56) References Cited

U.S. PATENT DOCUMENTS

| | | | |
|---|---|---|---|
| 9,470,466 B2* | 10/2016 | Washburn, III | F41A 21/30 |
| 9,982,959 B2* | 5/2018 | Washburn, III | F41A 21/30 |
| 2011/0220434 A1* | 9/2011 | Silvers | F41A 21/30 |
| | | | 181/223 |
| 2012/0152649 A1* | 6/2012 | Larue | F41A 21/36 |
| | | | 181/223 |
| 2014/0262605 A1* | 9/2014 | Washburn, III | F41A 21/30 |
| | | | 181/223 |
| 2018/0031346 A1* | 2/2018 | Washburn, III | F41A 21/30 |

* cited by examiner

*Primary Examiner* — Forrest M Phillips
(74) *Attorney, Agent, or Firm* — Keating & Bennett, LLP

(57) ABSTRACT

A noise suppression device for use with a firearm includes a body including an outermost external surface of the noise suppression device, an internal portion, a first end, and a second end; and a core seamlessly connected to the internal portion of the body, wherein the noise suppression device includes no joints, no seams, or any formerly separate pieces within the body or the core, and a porosity of a first portion of the body that is adjacent to the first end is different than a porosity of a second portion of the body that is adjacent to the second end. Alternatively, the core includes a plurality of baffles, and a porosity of a first baffle that is adjacent to the first end is different than a porosity of a second baffle that is adjacent to the second end.

17 Claims, 30 Drawing Sheets

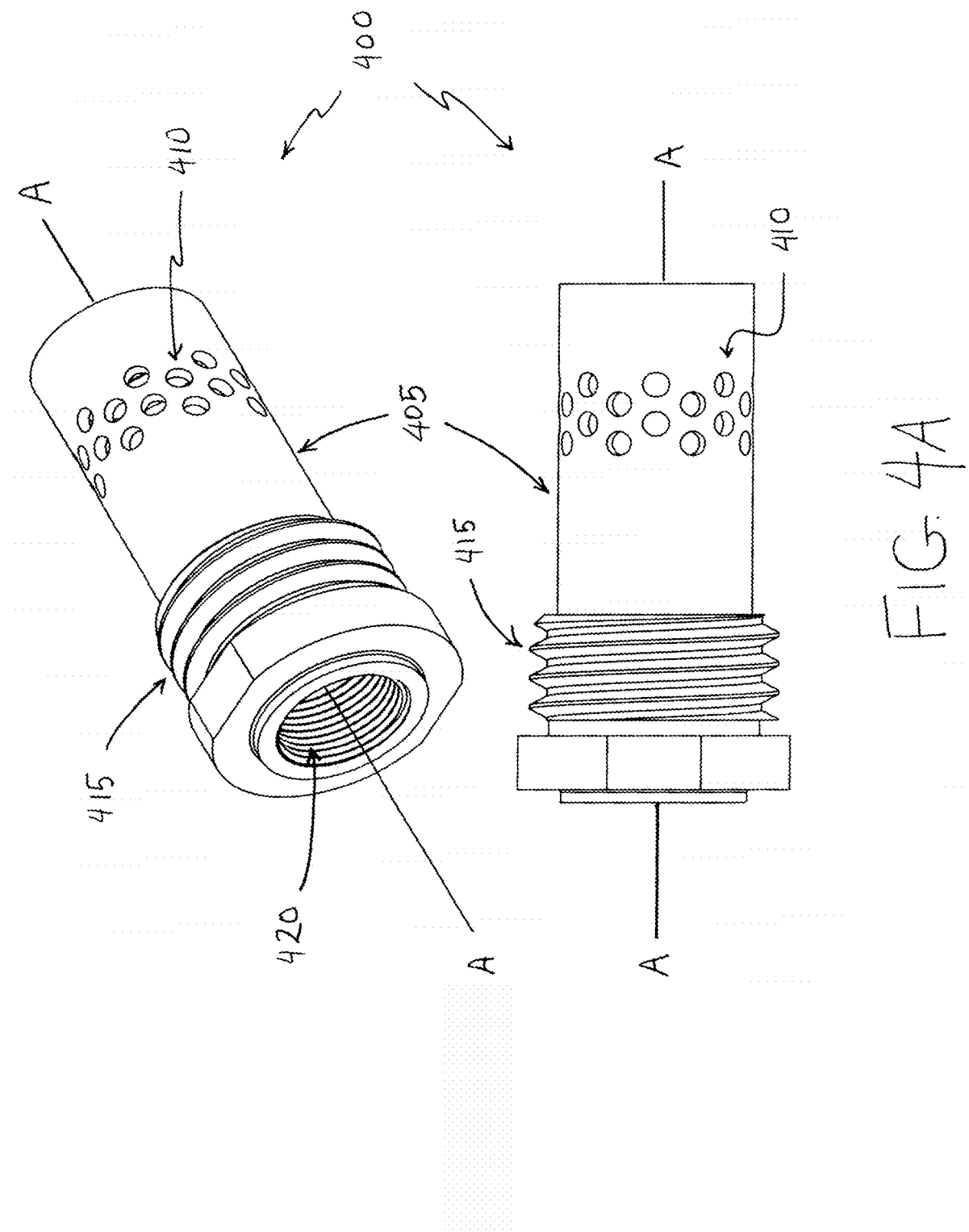

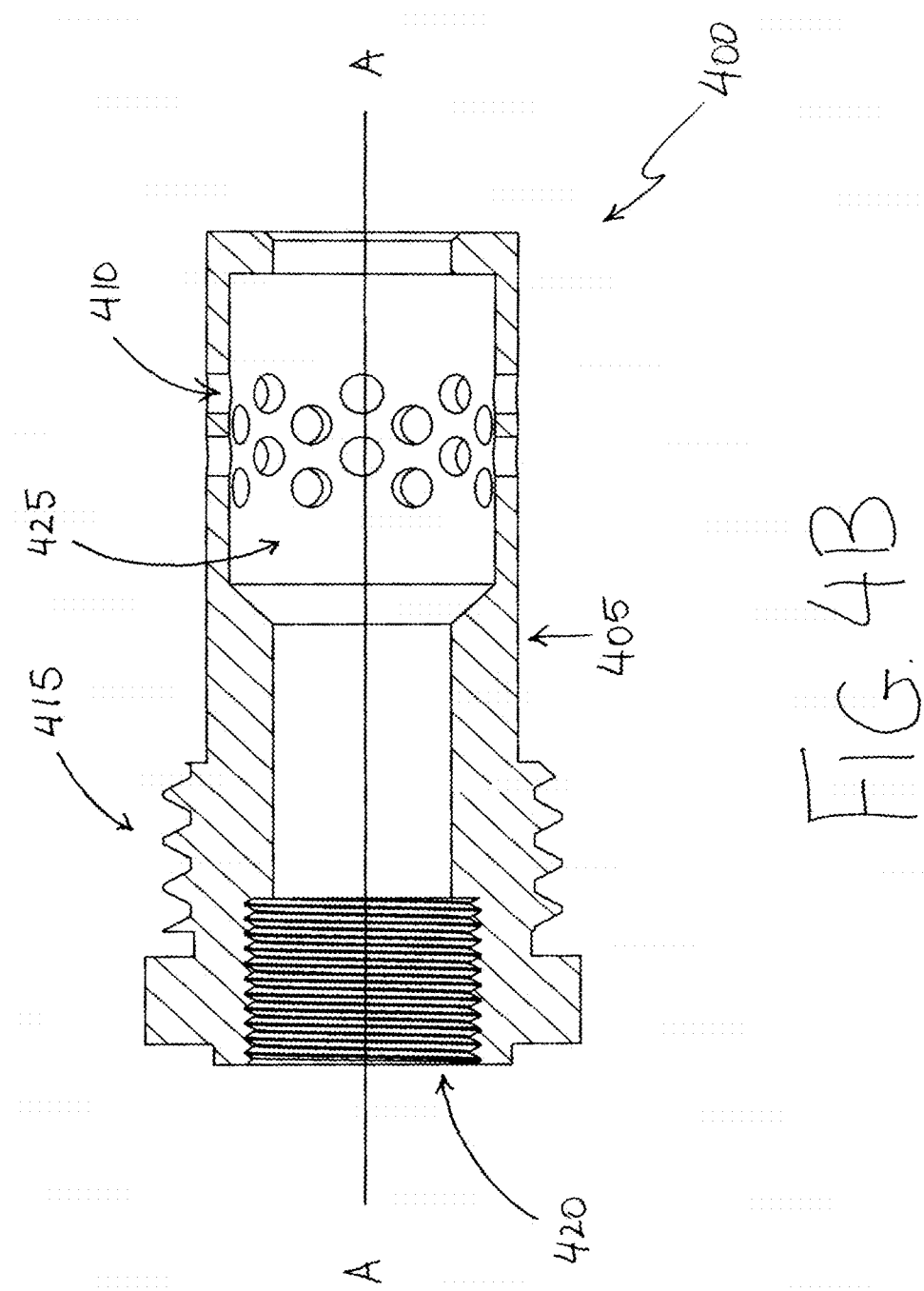

MONOLITHIC NOISE SUPPRESSION DEVICE WITH PURPOSELY INDUCED POROSITY FOR FIREARM

FIELD OF THE INVENTION

The present invention relates to noise suppression devices, and more particularly, noise suppression devices that are used with firearms.

BACKGROUND

Noise associated with the use of a firearm is, in general, attributed to two factors. The first factor is associated with the velocity of the bullet. If the bullet is traveling hypersonically (i.e., faster than the speed of sound), the bullet will pass through the slower moving sound wave preceding it, thus creating a relatively small sonic boom, similar to the sonic boom of a supersonic aircraft passing through its sound wave. The second factor is associated with the rapid expansion of propellant gas produced when the powder inside the bullet cartridge ignites. When the propellant gas rapidly expands and collides with cooler air, in and around the muzzle of the firearm, a loud bang sound occurs. Firearm noise suppression devices (hereafter "noise suppression devices") are employed to reduce noise attributable to the second factor identified above. Noise suppression devices have been in use at least since the late nineteenth century.

FIG. 1 is a section view of a contemporary noise suppression device 100. As illustrated, noise suppression device 100 includes an inner structure or core 105 and an outer structure 110. Typically, the core 105 and the outer structure 110 are manufactured independent of each other. Subsequently, the core 105 is inserted in and secured to the outer structure 110. Securing the inner structure 105 to the outer structure 110 may be achieved by welding (e.g., spot welding) the former to the latter. Together, the core 105 and outer structure 110 are often referred to as a "can."

The core 105, in turn, comprises a plurality of linearly arranged segments that together form a plurality of compartments 105a through 105f, wherein adjacent compartments are separated by a corresponding baffle 115a through 115e. It is very common to manufacture each segment separately and then attach the segments together, e.g., by welding the segments, to form the aforementioned linear arrangement, as suggested by the weld joints or seams that appear between each of the segments in FIG. 1 (see e.g., seams 120a, 120b, 120c, 120d and 120e). Although it may be common to manufacture each of the aforementioned segments separately and then subsequently attach them together, it is also known to manufacture the segments as a single, integral unit. Such a unit is referred to as a monolithic core. The monolithic core is then inserted in and secured to the outer structure 110, as previously described.

Additionally, the distal end of the core 105 comprises an end cap segment 125, while the proximal end of the core 105 comprises a base cap segment 130. As illustrated, there is an opening formed through each of the baffles 115a through 115e, the end cap structure 125 and the base cap structure 130, along a longitudinal centerline Y, which defines the path through the noise suppression device 100 traveled by each fired bullet.

Although it is not shown in FIG. 1, the proximal end of the noise suppression device 100 would comprise an attachment structure. The attachment structure would be configured to attach the noise suppression device 100 to a complimentary structure associated with the muzzle of the firearm.

As mentioned above, noise suppression devices reduce the noise associated with the rapid expansion of propellant gas when the powder inside the bullet cartridge ignites and the propellant gas subsequently collides with cooler air in and around the muzzle of the firearm. In general, noise suppression devices reduce the noise by slowing the propellant gas, thus allowing the propellant gas to expand more gradually and cool before it collides with the air in and around the muzzle of the firearm.

Thus, with respect to the noise suppression device 100 in FIG. 1, the bullet will first pass from the muzzle of the firearm into the first expansion chamber 135. It should be noted that this first chamber is often called a blast chamber or blast baffle. The first expansion chamber 135 allows the propellant gas to expand and cool, thereby reducing the amount of energy associated with the gas. The bullet then successively passes through the openings in each of the baffles 115a through 115e, wherein the baffles further deflect, divert and slow the propellant gas. By the time the bullet and gas exit the opening through the end cap structure 125 at the distal end of the noise suppression device 100, the gas has already substantially slowed, expanded and cooled, thus reducing the noise associated with the gas colliding with the cooler air in and around the distal end of the noise suppression device 100.

Conventional noise suppression devices are typically constructed from steel, aluminum, titanium or other metals or metal alloys. Metals generally have good thermal conductivity characteristics. Therefore, metal noise suppression devices can better absorb the heat that is produced by the rapidly expanding propellant gas. This ability to better absorb the heat helps to more quickly cool the propellant gas, thereby reducing both the temperature and volume of the gas, and in turn, the resulting noise when the gas collides with the ambient air.

Despite the fact that noise suppression devices have been in use for well over 100 years, and numerous improvements have been made over this time period, there are still many disadvantages associated with conventional noise suppression devices. For example, the noise suppression device 100 described and illustrated above inherently has reliability issues in that each welding joint or seam increases the probability of structural failure due to the high levels of pressure associated with the propellant gas inside the device.

The use of metal also leads to certain disadvantages. Metal is costly and manufacturing a noise suppression device, such as noise suppression device 100, is somewhat complex. Consequently, manufacturers may be discouraged to make and customers may be reluctant to purchase customized noise suppression devices, as customized noise suppression devices are likely to be even more costly and more complex to manufacture. An example of a customized noise suppression device may be one that is designed and constructed to operate in conjunction with, or at least not interfere with a particular gun sight.

Further with regard to the use of metal, the aforementioned thermal conductivity may actually be undesirable in certain situations. For instance, after firing the weapon, the noise suppression device may be very hot due to the fact that the metal is efficient at absorbing the heat associated with the propellant gas. This is particularly true if the weapon is fired repeatedly. And, if the noise suppression device is hot, it may be very difficult for the user to remove it from the weapon until it cools. This may be unacceptable if the user needs to quickly replace the noise suppression device for another. In a military environment, a hot noise suppression device may also be highly visible to enemy combatants using infrared technology, thus exposing the user to greater risk.

Yet another disadvantage associated with metal noise suppression devices is that these noise suppression devices are considered weapons in and of themselves, separate and apart from the firearm to which they may be attached. Thus, they are regulated under the National Firearms Act (1934) (NFA). As such, these devices must be separately marked and registered, and they cannot simply be discarded when they are worn or otherwise fail to function adequately. This is true, even if the devices are being used in a war zone or military environment.

Therefore, despite the many improvements that have been effectuated over the decades, additional design features and manufacturing techniques are warranted to improve the reliability, enhance the noise reduction, reduce the costs, facilitate customization and eliminate the restriction on disposability of conventional noise suppression devices. The present invention offers a number of improvements that address these concerns.

SUMMARY OF THE INVENTION

The present invention achieves its intended purpose through design features and manufacturing techniques that both individually and in conjunction with each other offer improvements over current, state-of-the-art noise suppression devices. More particularly, the present invention involves a truly monolithic noise suppression device, also referred to herein below as an integral baffle housing module. Unlike the noise suppression device 100 illustrated in FIG. 1, the integral baffle housing module, in accordance with exemplary embodiments of the present invention, at least exhibits no welded joints or seams associated with the core nor any welded joints or seams between the core and any interior surface and/or structure.

A noise suppression device for use with a firearm includes a body including an outermost external surface of the noise suppression device, an internal portion, a first end, and a second end; and a core seamlessly connected to the internal portion of the body, wherein the noise suppression device includes no joints, no seams, or any formerly separate pieces within the body or the core, and a porosity of a first portion of the body that is adjacent to the first end is different than a porosity of a second portion of the body that is adjacent to the second end.

A noise suppression device for use with a firearm can also include a body including an outermost external surface of the noise suppression device, an internal portion, a first end, and a second end; and a core seamlessly connected to the internal portion of the body, wherein the noise suppression device includes no joints, no seams, or any formerly separate pieces within the body or the core, the core includes a plurality of baffles that separate a plurality of chambers, and a porosity of a first baffle of the plurality of baffles that is adjacent to the first end is different than a porosity of a second baffle of the plurality of baffles that is adjacent to the second end.

A noise suppression device can also include a feature where porosity of the body increases between the second end and the first end.

A noise suppression device can also include a feature where a porosity of the first end and a porosity of the second end are less than the porosity of the first portion of the body and the porosity of the second portion of the body.

A noise suppression device can also include a feature where a porosity of a first portion of the body that is adjacent to the first end, a porosity of a second portion of the body that is adjacent to the second end, and a porosity of a third portion of the body that is between the first portion and the second portion of the body are different from each other.

A noise suppression device can also include a feature where the porosity of the first baffle, the porosity of the second baffle, and a porosity of a third baffle of the plurality of baffles are different from each other.

A noise suppression device can also include a feature where the noise suppression device is made of a plastic.

A noise suppression device can also include a feature where the noise suppression device is made of a metal or a metal alloy.

A noise suppression device can also include a feature where the noise suppression device is a three-dimensional-printed structure.

The above and other features, elements, characteristics, steps, and advantages of the present invention will become more apparent from the following detailed description of preferred embodiments of the present invention with reference to the attached drawings.

BRIEF DESCRIPTION OF THE DRAWINGS

Several figures are provided herein to further the explanation of the present invention. More specifically:

FIGS. 4A and 4B are side, perspective and longitudinal section views of a first stage noise suppression device, in accordance with an exemplary embodiment of the present invention;

DETAILED DESCRIPTION OF THE INVENTION

It is to be understood that both the foregoing general description and the following detailed description are exemplary. The descriptions herein are not intended to limit the scope of the present invention. The scope of the present invention is governed by the scope of the appended claims.

The noise suppression device, in accordance with exemplary embodiments of the present invention, is a truly monolithic device which is also referred to herein as an integral baffle housing module. As previously stated, it is preferably made of plastic. Also, as previously stated, it is preferably employed with a first stage noise suppression device.

Figure 2:
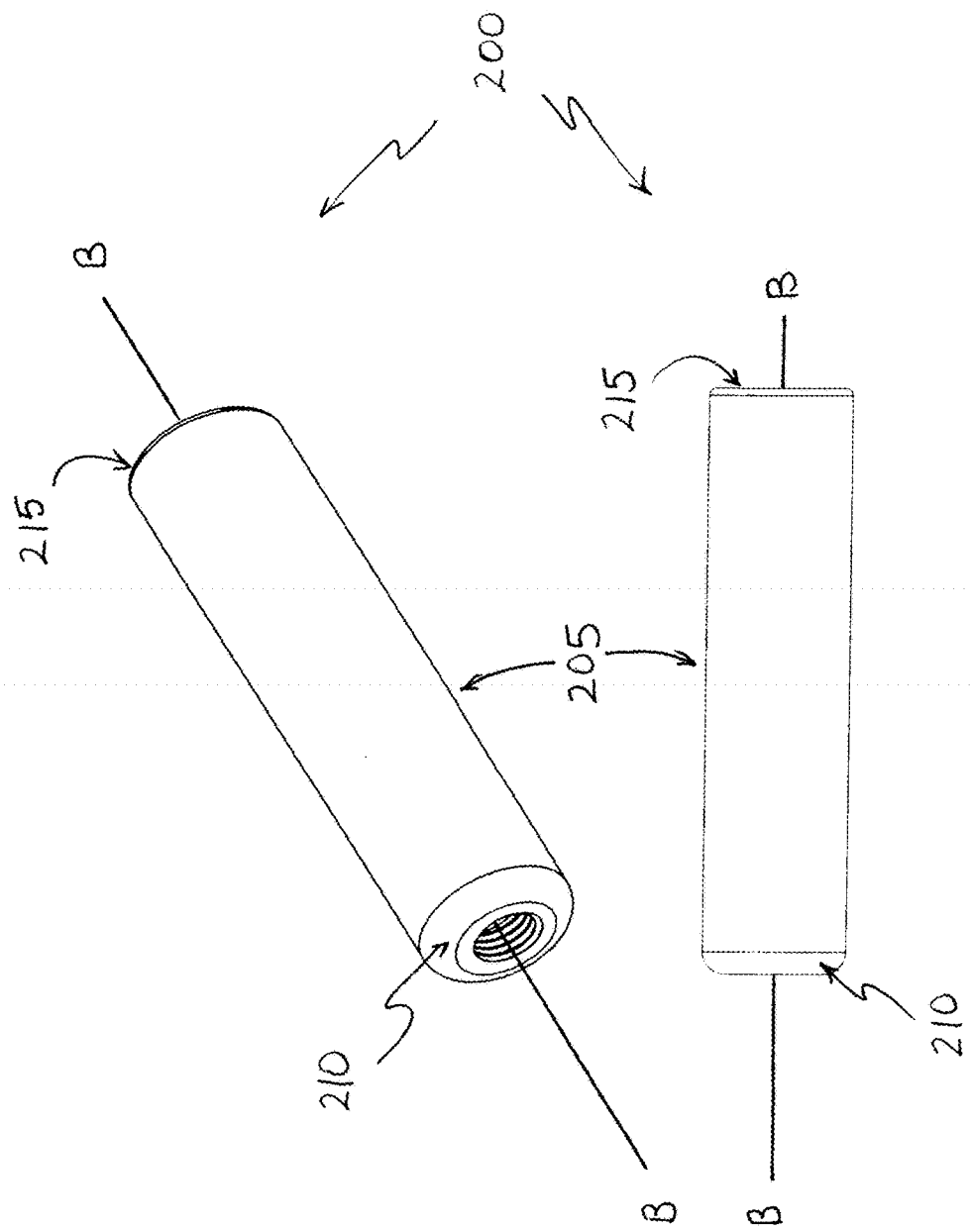
FIG. 2 is a side exterior view and a perspective exterior view of an integral baffle housing module, in accordance with a first exemplary embodiment of the present invention.

FIG. 2 illustrates a side exterior view and a perspective exterior view of an integral baffle housing module 200, in accordance with an exemplary embodiment of the present invention. As illustrated, the integral baffle housing module 200 comprises a generally cylindrical body 205; however, the present invention is not limited by nor is the function affected by the shape of the body 205. Additionally, the body 205 comprises an integral, proximal end cap 210 and an integral, distal end cap 215.

Figure 3:
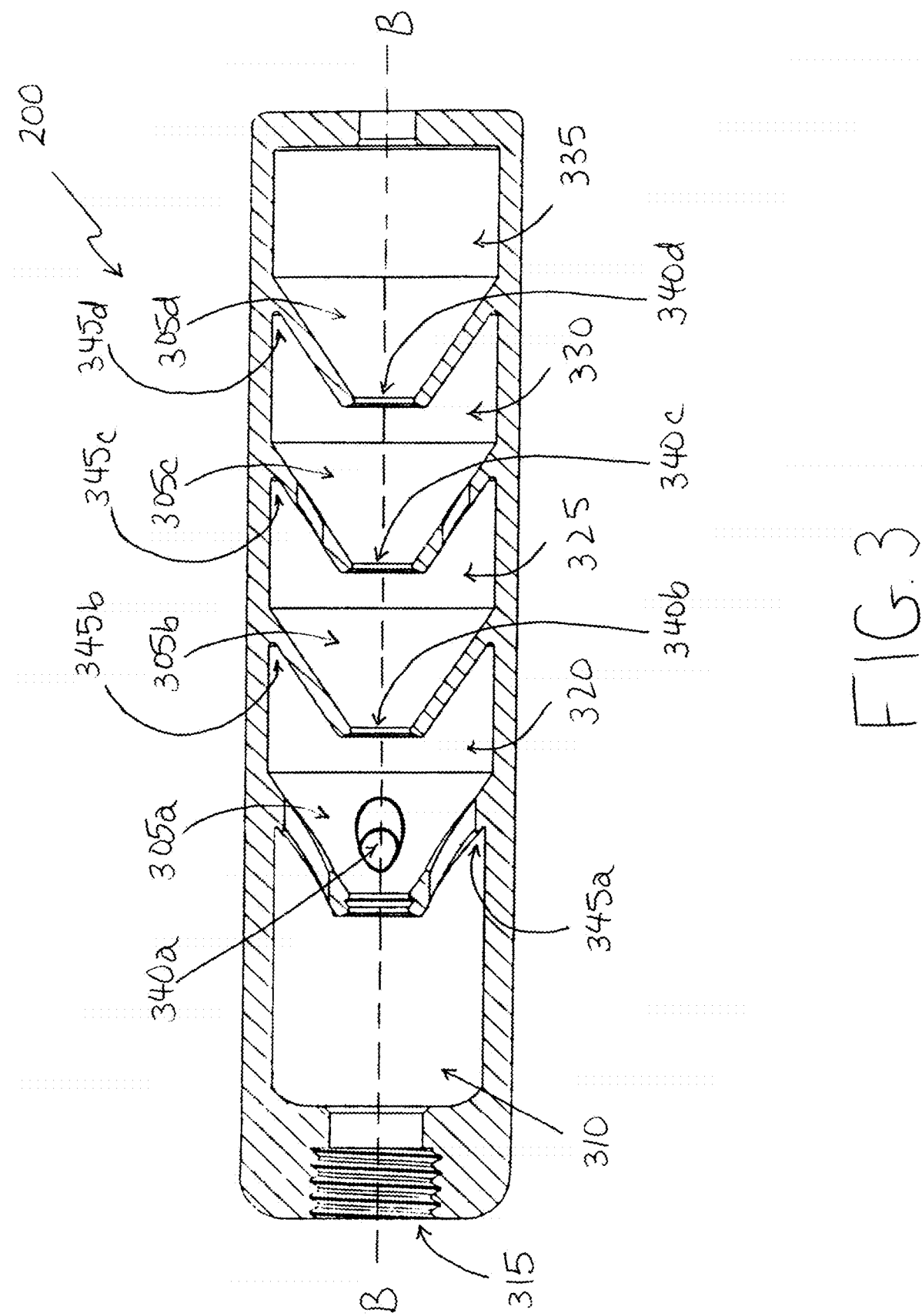
FIG. 3 is a longitudinal section view of the integral baffle housing module, in accordance with the first exemplary embodiment.

FIG. 3 illustrates a longitudinal section view of the integral baffle housing module 200, in accordance with a first exemplary embodiment of the integral baffle housing module 200. As illustrated, the integral baffle housing module 200 comprises a plurality of baffles 305a, 305b, 305c and 305d, which constitute all or a part of the core of the integral baffle housing module 200. It is common to refer to the plurality of baffles as a baffle stack. It will be understood, however, that the present invention is not limited to a device having a specific number of baffles. Thus, the integral baffle housing module 200 could comprise one baffle or more than one baffle (i.e., a plurality of baffles).

The integral baffle housing module 200, according to the first exemplary embodiment, further comprises a number of interior chambers. These chambers include a first expansion chamber 310. As stated previously, this first chamber is often referred to as a blast chamber or blast baffle. The first expansion chamber 310 is generally located between baffle 305a and proximal end cap 210. The chambers also include chambers 320, 325, 330 and 335, where chamber 320 is generally located between baffles 305a and 305b, chamber 325 is generally located between baffles 305b and 305c, chamber 330 is generally located between baffles 305c and 305d, and chamber 335 is generally located between baffle 305d and distal end cap 215.

Further in accordance with the first exemplary embodiment of the integral baffle housing module 200, as illustrated in FIG. 3, each of the baffles 305a, 305b, 305c and 305d may be structurally identical. However, in FIG. 3, baffle 305a is shown in more complete form than are baffles 305b, 305c and 305d in order to better illustrate the fact that each of the baffles 305a, 305b, 305c and 305d has formed therethrough an opening 340a, 340b, 340c and 340d, respectively. It should be evident that the openings 340a, 340b, 340c and 340d are centered on longitudinal axis B and that the path of a fired bullet follows longitudinal axis B through each of these openings.

Also, as illustrated in FIG. 3, the integral baffle housing module 200 comprises an attachment mechanism, such as female threads 315. As previously stated, it is preferable that the integral baffle housing module 200 be used in conjunction with a first stage noise suppression device, described in detail below, where the first stage noise suppression device is configured to attach directly to the firearm, and the integral baffle housing module 200 is configured to attach to the first stage noise suppression device. The female threads 315 represent an exemplary attachment mechanism that is configured to attach the integral baffle housing module 200 to a complimentary attachment mechanism associated with the first stage noise suppression device. Those skilled in the art will appreciate the fact that other attachment mechanism configurations are within the scope of the present invention. If the integral baffle housing module 200 is not used in conjunction with a first stage noise suppression device, the attachment mechanism, such as the female threads 315 would be used to attach the integral baffle housing module 200 directly to the muzzle of the firearm.

In accordance with the present invention, the integral baffle housing module 200 is manufactured as a monolithic unit. In accordance with an exemplary embodiment, the integral baffle housing module 200 is made from plastic and manufactured using a layered printing process. Layered printing is a well known process for manufacturing three-dimensional objects from a digital model, whereby micro-thin layers of the manufacturing material are laid down successively until the entire three-dimensional object is complete.

As referred to herein below, an integral baffle housing module is monolithic if there are at least no welded joints or seams between the various components that make up the core of the integral baffle housing module (e.g., the one or more baffles), and no welded joints or seams between the core, or any structures that make up the core, and the various interior surfaces and/or structures that make up the body of the integral baffle housing module 200. For example, comparing the longitudinal view of integral baffle housing module 200 in FIG. 3 to the conventional noise suppression device 100 in FIG. 1, it can be seen that no welded joints or seams, such as seams 120a, 120b, 120c, 120d and 120e, exist in the integral baffle housing module 200. As stated, this can be accomplished using a layered printing process.

It should be noted, however, the present invention does not necessarily exclude the addition of other structural components that are not integral, so long as there are at least no welded joints or seams between the various components that make up the core of the integral baffle housing module (e.g., the one or more baffles), and no welded joints or seams between the core, or any structures that make up the core, and the various interior surfaces and/or structures that make up the body of the integral baffle housing module 200, as stated above. For example, in the first exemplary embodiment of FIGS. 2 and 3, the proximal and distal end caps 210 and 215 are illustrated as being integral components of the integral baffle housing module 200. That is, there are no welded joints or seams between the end caps and the body of the integral baffle housing module 200. However, in accordance with exemplary embodiments of the present invention, the integral baffle housing module is still considered monolithic even if the end caps are not integral, so long as the other aforementioned requirements are met.

Figure 1:
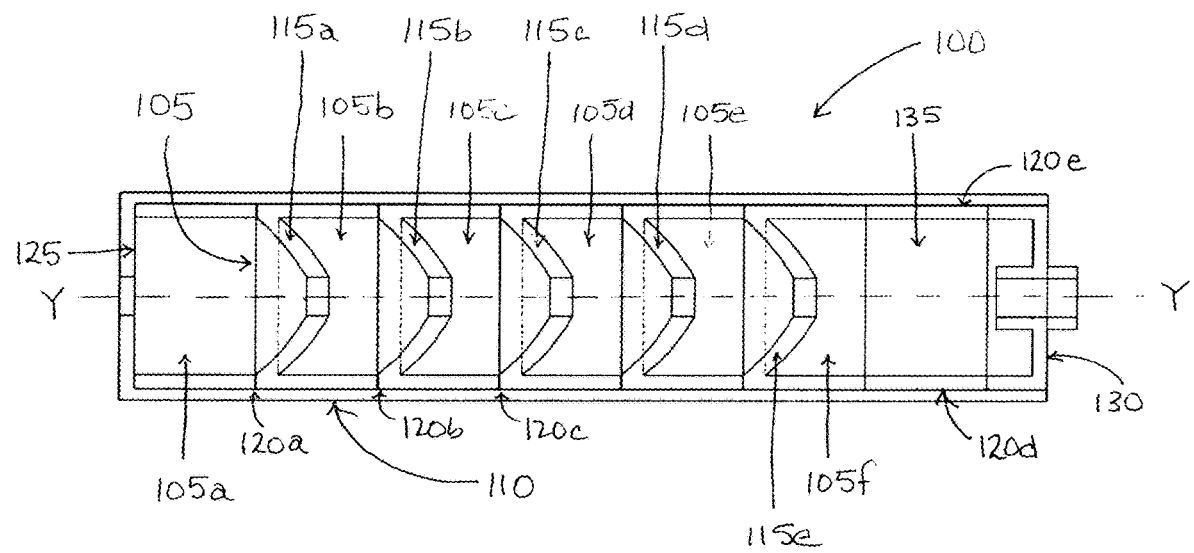
FIG. 1 is a section view of a contemporary noise suppression device.

As one skilled in the art will readily appreciate, the propellant gas exerts a great deal of pressure on the inner surfaces of any noise suppression device, and the welded joints or seams, such as seams 120a, 120b, 120c, 120d and 120e illustrated in the conventional noise suppression device 100 of FIG. 1, are more likely to serve as points of mechanical failure than the corresponding, seamless points in integral baffle housing module 200. Thus, as stated above, manufacturing the integral baffle housing module 200 as a monolithic unit will enhance the structural integrity of the device.

While the present invention is not limited to a integral baffle housing module made of plastic, the use of plastic results in several unexpected benefits. First, plastic is relatively porous in comparison to metal. Experimental tests suggest that this porosity provides an alternative pathway for the expanding propellant gas to escape the suppressor. Furthermore, as a result of the layered printing process, there are actually very small layers of air between each of the layers of plastic material. The testing also suggests that the expanding propellant gas is able to escape through these layers of air. Although the amount of propellant gas that actually escapes through these alternative pathways is relatively small, it is enough to realize a measurable improvement in noise reduction as a result.

Second, materials such as metal, that exhibit good heat absorption (i.e., good heat transfer characteristics), generally make good noise suppression devices because they have the ability to remove heat from the expanding propellant gas, thus lowering the temperature of the gas and improving noise suppression. While plastic does not absorb heat as well as metal, the aforementioned porosity of plastic is still effective in removing heat from the propellant gas because the porosity allows the heat, along with the propellant gas, to vent from the inside to the outside of the integral baffle housing module.

Further, because plastic does not absorb heat as does metal, the temperature of the plastic will stay relatively cool, compared to metal, despite the excessive heat produced by the propellant gas. Thus, if the user wants to remove the integral baffle housing module, the user will be able to do so soon, if not immediately after firing the weapon. In contrast, a user will need to wait a longer period of time to remove a metal noise suppression device, absent the use of well insulted gloves or some other insulated material to protect the user's hands from burning. The ability to immediately remove the integral baffle housing module may be a great advantage, particularly if the user needs to quickly swap the integral baffle housing module for another and resume firing.

Still further, another unexpected benefit is that a plastic integral baffle housing module suppressor will have a significantly lower heat signature compared to a metal noise suppression device. This benefit may be particularly advantageous in military environments in that the plastic integral baffle housing module will be less visible to enemy combatants using infrared sensors, which are commonly employed in night-vision equipment.

Also, plastic is generally less expensive than metal. Thus, it is generally less expensive to manufacture suppressors made of plastic. Because it is less expensive to manufacture a plastic suppressor, it is more practical to customize suppressors to meet very specific mission requirements. For example, if there is a specific need to manufacture a noise suppression device that can be used in conjunction with a particular firearm and, possibly, a very specific gun sight, then plastic may be more practical than metal.

Further in accordance with the first exemplary embodiment, integral baffle housing module 200 comprises several rounded or filleted portions 345a, 345b, 345c and 345d. These portions coincide with the intersection between certain interior surfaces. Preferably, these rounded or filleted portions generally face towards the proximal end of the integral baffle housing module 200, in a direction that is generally opposite the flow of the propellant gas. When the propellant gas strikes these rounded or filleted portions, the rounded or filleted portions exacerbate the turbulent flow of the propellant gas. As those skilled in the art understand, turbulent gas flow slows down the movement of the gas which, in turn, enhances noise suppression.

As mentioned, it is preferable, though not required, that integral baffle housing module 200 be used in conjunction with a first stage noise suppression device. FIG. 4A illustrates a side view and a perspective view of an exemplary first stage noise suppression device 400, in accordance with an exemplary embodiment of the present invention. As illustrated, the first stage noise suppression device 400 comprises a generally cylindrical body 405. The body 405, in turn, comprises a plurality of openings 410. Additionally, the first stage noise suppression device 400 is preferably manufactured from an appropriate metal or metal alloy. However, it will be understood that the scope of the present invention is not a function of nor is it limited by the shape of the body 405, the shape, size or number of openings 410 there through, or the material that is used to manufacture the first stage noise suppression device 400.

The first stage noise suppression device 400 also comprises two threaded portions: a first threaded portion 415 and a second threaded portion 420. The first threaded portion 415 is illustrated as comprising male threads formed around the outside of the first stage noise suppression device 400. In accordance with this exemplary embodiment, the first threaded portion 415 is configured to communicate with the female threads 315 of integral baffle housing module 200 in order to physically attach the integral baffle housing module 200 and the first stage noise suppression device 400 to each other. When the first stage noise suppression device 400 and the integral baffle housing module 200 are physically attached, it will be understood that, in accordance with this exemplary embodiment, the body 405 of the first stage noise suppression device 400 extends through an opening in the proximal end cap 210 of the integral baffle housing module 200 and into the first expansion chamber 310, such that the longitudinal axis A associated with the first stage noise suppression device 400 aligns with the longitudinal axis B associated with the integral baffle housing module 200. The second threaded portion 420 of the first stage noise suppression device 400 is illustrated as comprising female threads formed on the interior of the secondary noise suppression module 400. In accordance with this exemplary embodiment, the second threaded portion 420 is configured to communicate with corresponding male threads on the barrel of the firearm in order to physically attach the first stage noise suppression device 400 to the firearm. Those skilled in the art will appreciate that structures other than the first threaded portion 415 and the second threaded portion 420 may be used to attach the first stage noise suppression device 400 to the integral baffle housing module 200 and the first stage noise suppression device 400 to the firearm, respectively.

Additionally, the first stage noise suppression device 400 is formed around a longitudinally extending opening or bore centered on longitudinal axis A. The first stage noise suppression device 400 is configured such that the bore aligns with the bore of the firearm barrel. As such, the bullet, after it travels through the bore of the firearm barrel, will travel through the bore of the first stage noise suppression device 400 and eventually into the integral baffle housing module 200.

FIG. 4B is a longitudinal section view of the first stage noise suppression device 400. It will be understood from FIG. 4B that the first stage noise suppression device 400 is, in and of itself, a noise suppression device, separate and apart from the integral baffle housing module 200. In accordance with the exemplary embodiment of FIG. 4B, first stage noise suppression device 400 comprises an expansion or blast chamber 425, where the aforementioned openings 410 are formed there through. As the bullet travels through the bore of the first stage noise suppression device 400, the expansion chamber 425 and the openings 410 collectively allow the propellant gas to expand, cool and ultimately vent into the first expansion chamber 310 of the integral baffle housing module 200.

Figure 5:
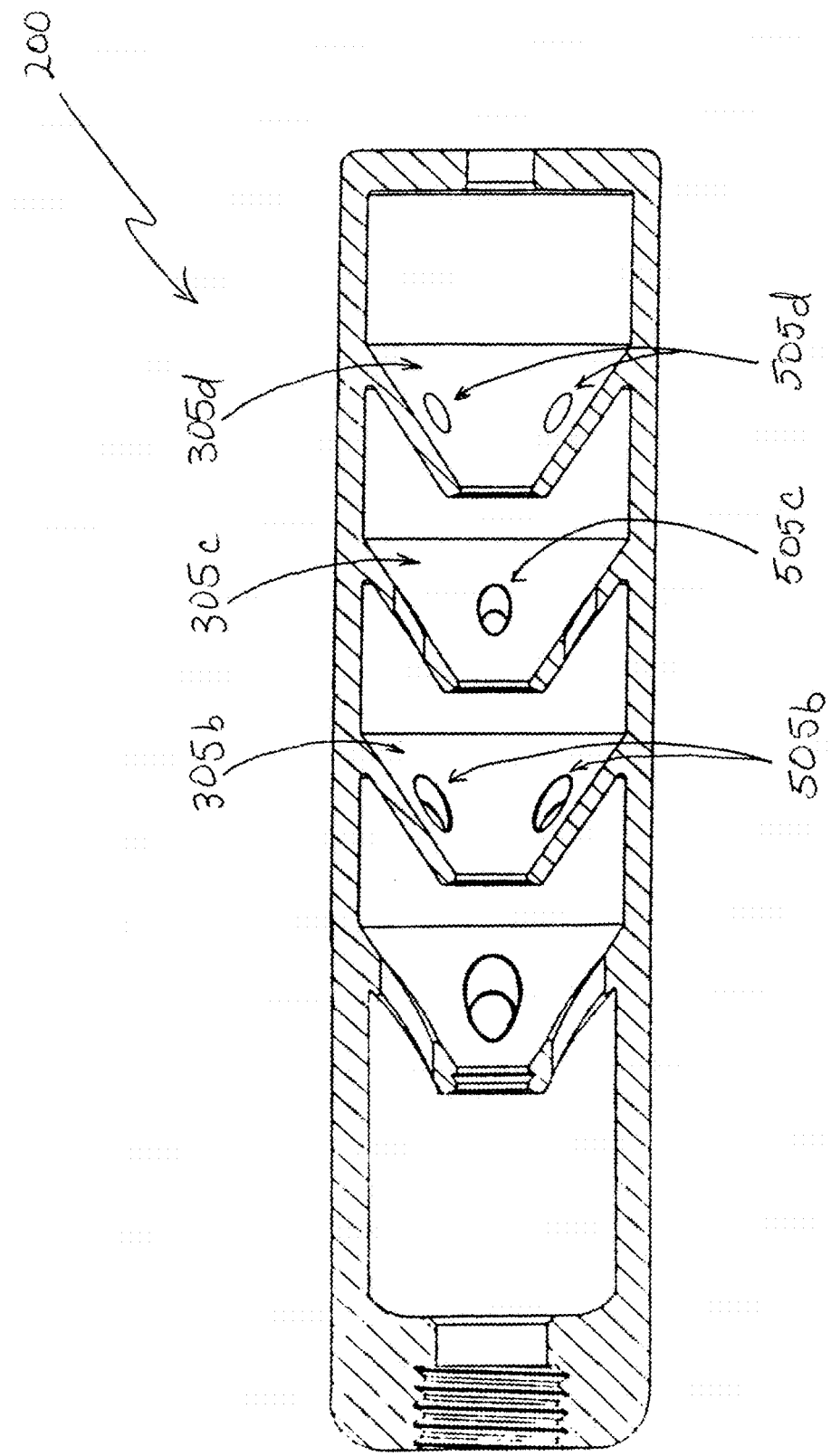
FIG. 5 is a longitudinal section view of the integral baffle housing module, in accordance with a second exemplary embodiment.

FIG. 5 illustrates a longitudinal section view of integral baffle housing module 200, in accordance with a second exemplary embodiment of the integral baffle housing module 200. As shown, the second exemplary embodiment appears similar to the first exemplary embodiment but for baffles 305b, 305c and 305d have bleed holes 505b, 505c and 505d formed there through. The bleed holes 505b, 505c and 505d allow the propellant gas to bleed into the next chamber. The bleed holes may be the same in terms of size and orientation; however, in an exemplary embodiment, the size of the bleed holes is smaller towards the distal end of the integral baffle housing module 200 and the orientation of the bleed holes varies with respect to their position on or through the corresponding baffle. By varying the size and orientation of the bleed holes 505b, 505c and 505d, as shown, the force and pressure associated with the propellant gas is more evenly distributed within the integral baffle housing module 200, while helping to slow the movement of the propellant gas. As stated, slowing down the movement of the propellant gas enhances noise suppression.

It is known in the art to place ablative material inside conventional noise suppression devices. The ablative material is typically in the form of a gel or liquid. These conventional noise suppression devices are generally referred to as "wet" suppressors. The gel or liquid absorbs the heat from the propellant gas, thereby cooling the gas and reducing noise. However, keeping the ablative material inside the noise suppression device can be problematic. Thus, FIG. 6 illustrates a longitudinal section view of integral baffle housing module 200, in accordance with a third exemplary embodiment of the integral baffle housing module 200, wherein one or more interior surface(s) associated with the integral baffle housing module 200 are configured to better retain ablative material placed therein.

More specifically, at least the first expansion chamber 610 would contain ablative material, and to help retain or otherwise hold the ablative material in place, the interior surface of the first expansion chamber 610 is textured or patterned. In the exemplary embodiment illustrated in FIG. 6, a lattice-like structure 650 is employed. The lattice-like structure 650 would be particularly useful where the ablative material is a gel or otherwise viscous in nature. After injecting the ablative material into the first expansion chamber 610 and spinning the integral baffle housing module 200 so that the ablative material is evenly distributed within the first expansion chamber 610, the lattice-like structure 650 will serve to trap the ablative material, thereby holding the ablative material in place. It will be understood that ablative material could be similarly introduced into one or more of the other chambers in the integral baffle housing module 200 and that the interior surfaces of these chambers may likewise include a lattice-like structure or other effective textures or patterns.

Figure 7:
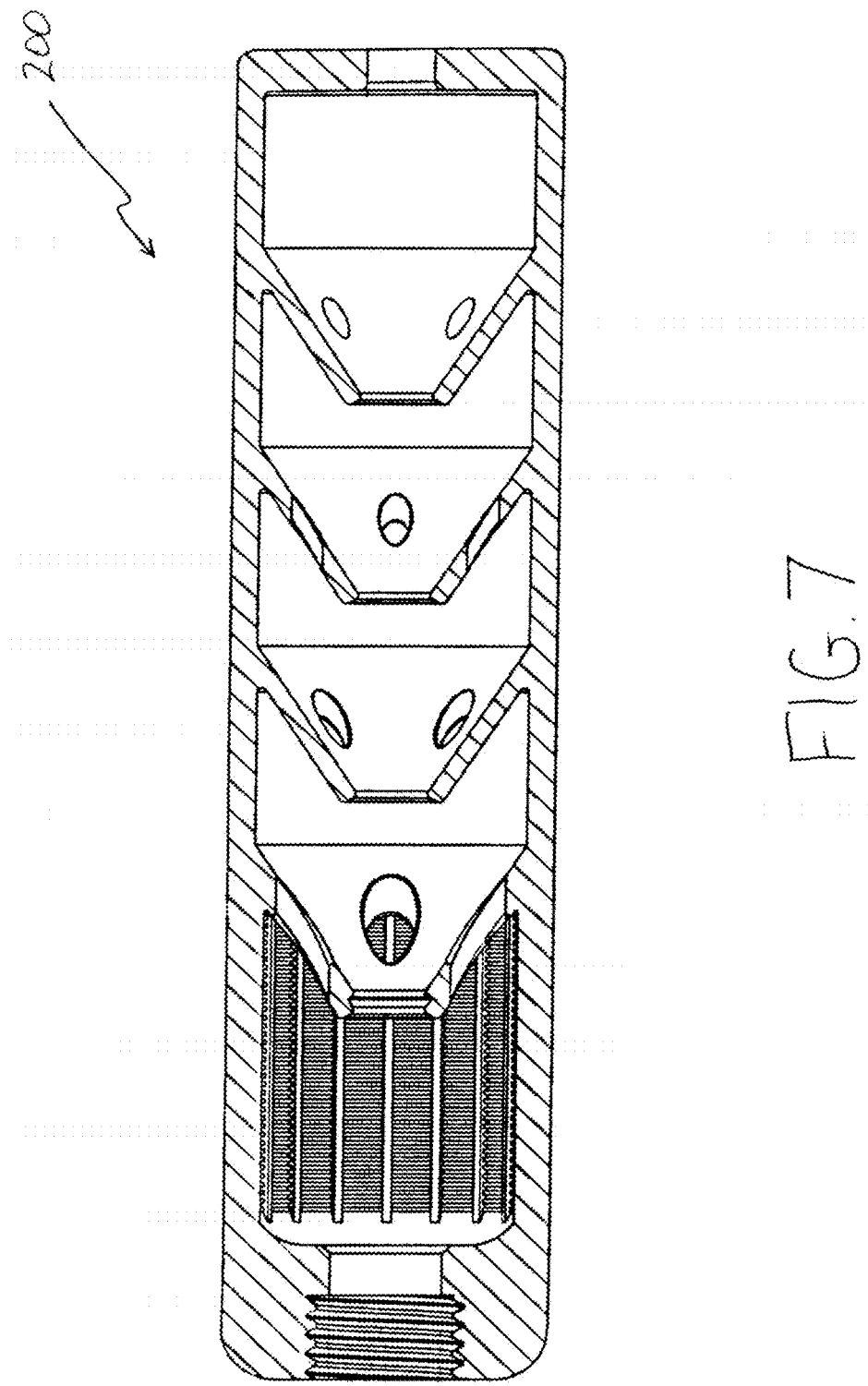
FIG. 7 is a longitudinal section view of an integral baffle housing module, in accordance with a fourth exemplary embodiment.

FIG. 7 illustrates a longitudinal section view of the integral baffle housing module 200, in accordance with a fourth exemplary embodiment of the integral baffle housing module 200. The purpose of FIG. 7 is to show that two or more of the features associated with the integral baffle housing module 200 maybe employed together in combination or separately as described above.

Figure 6:
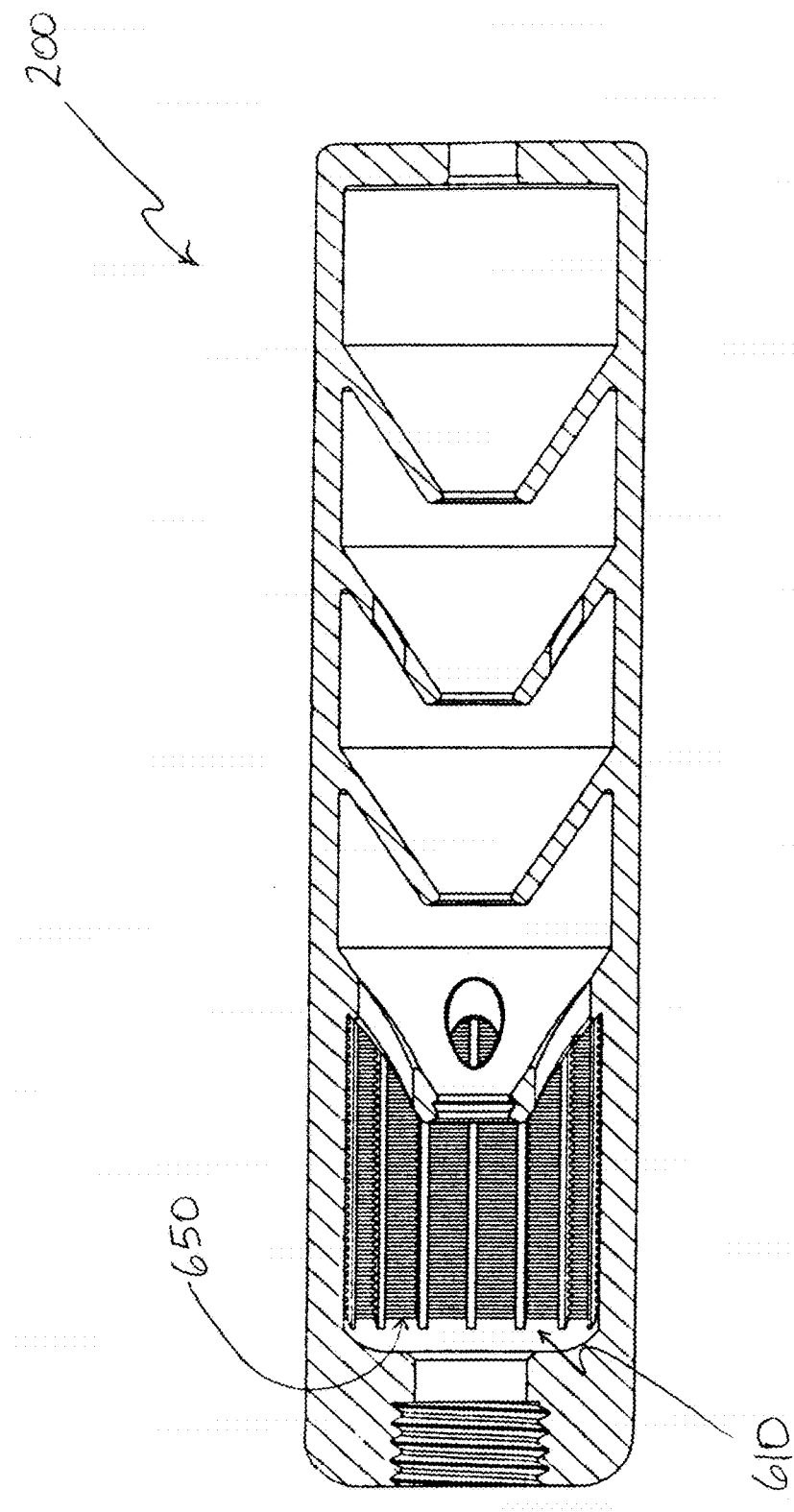
FIG. 6 is a longitudinal section view of the integral baffle housing module, in accordance with a third exemplary embodiment.
Figure 8:
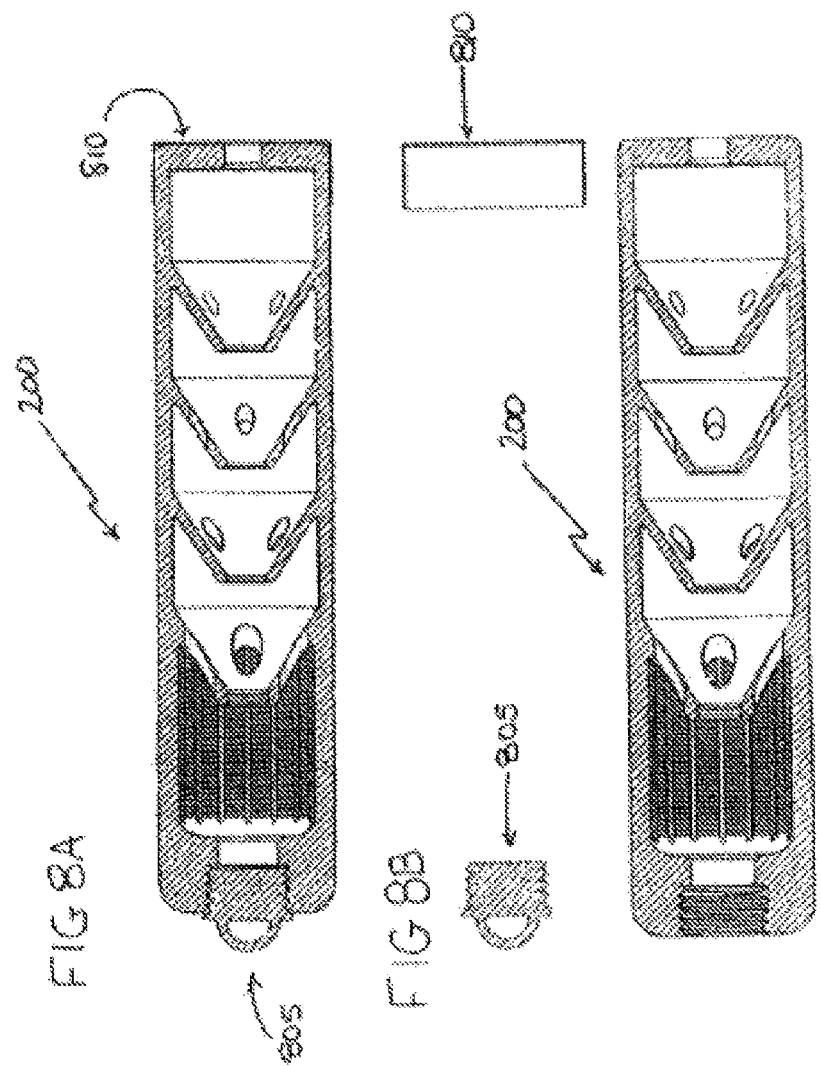
FIGS. 8A and 8B are longitudinal section views that illustrate exemplary components used to seal the openings through the proximal and distal end caps of an integral baffle housing module.

FIGS. 8A and 8B further illustrate that the third exemplary embodiment of FIG. 6 may be enhanced by closing off (i.e., sealing) the openings through the proximal and distal end caps of the integral baffle housing module 200. In FIGS. 8A and 8B, the components that are employed to seal the openings are plug 805, which closes off the opening in the proximal end of the integral baffle housing module 200, and seal 810, which closes off the opening in the distal end of the integral baffle housing module 200. By closing off the openings at both ends of the integral baffle housing module 200, it is possible to prevent the ablative material from being exposed to the air. When the integral baffle housing module 200 is first employed, the user would pull on plug 805, thereby removing it from the opening in the proximal end of the integral baffle housing module 200, attach the integral baffle housing module 200 to the first stage noise suppression device 400 (assuming the integral baffle housing module 200 is being used with the first stage noise suppression device 400) and then fire the first bullet, which pierces seal 810.

In accordance with an alternative embodiment relating to FIG. 6 and FIGS. 8A and 8B, if the ablative material introduced into integral baffle housing module 200 does not fill the entire interior space, it is possible to fill the remainder of that space with inert gas. The inert gas in conjunction with the ablative material will help prevent what is referred to in the art as "first round pop" because there is no oxygen in the integral baffle housing module 200.

In accordance with the exemplary embodiments of the present invention, as described above, the integral baffle housing module 200 is manufactured as a truly monolithic unit. Preferably, the monolithic integral baffle housing module 200 is made of plastic and manufactured using a layered printing process. Moreover, the integral baffle housing module 200 may comprise various other features, as detailed above, such as rounded or filleted portions, bleed holes and textured or patterned interior surfaces along with seals to help retain ablative material. These features enhance performance, reduce manufacturing cost and facilitate customization, as compared to conventional noise suppression devices, such as the noise suppression device illustrated in FIG. 1.

Additionally, the integral baffle housing module 200, according to exemplary embodiments of the present invention, may be used in conjunction with a first stage noise suppression device. If employed with a first stage noise suppression device, such as first stage noise suppression device 400 illustrated in FIG. 4, which attaches directly to the firearm, the first stage noise suppression device 400 may serve as the regulated noise suppression device under the NFA, whereas the integral baffle housing module 200 is deemed a mere accessory that need not be registered. As such, the integral baffle housing module 200 can be easily discarded or disposed of when it is worn or otherwise not functioning properly. Disposability is a major advantage, at least in terms of convenience, particularly when used for military operations and in combat zones, where it may be necessary to frequently change noise suppression devices because they are no longer functioning without having to carry around old, non-functioning devices.

Figure 9:
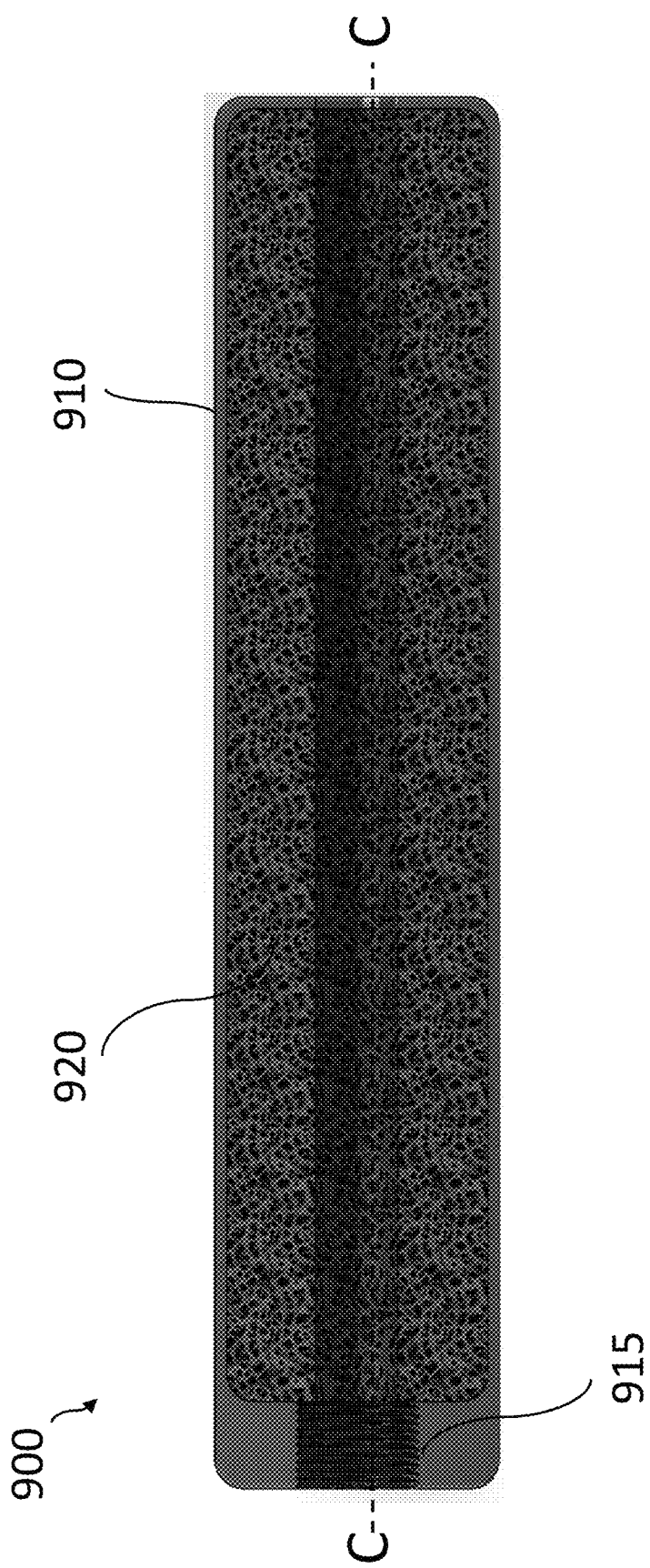
FIG. 9 is a longitudinal section view of a noise suppressor for a firearm, in accordance with a fifth exemplary embodiment.
Figure 10:
FIG. 10 is a perspective section view of a noise suppressor for a firearm of FIG. 9.

FIG. 9 illustrates a longitudinal section view of a monolithic noise suppression device 900, in accordance with a fifth exemplary embodiment. FIG. 10 shows a perspective view of the noise suppression device 900 of FIG. 9. As illustrated, and with previously described embodiments, the noise suppression device 900 has a generally cylindrical shape. However, the present invention is not limited by the shape of the body 910. The body 910 can alternatively include a geometric shape and can include features such as cut-outs, grooves, recesses, ridges, fins, etc. The body 910 includes an outer surface of the noise suppression device 900 and an inner portion that attaches to a core 920 that is integrally formed with and seamlessly connected to the body 910 defining a one-piece monolithic noise suppression device. Additionally, the body 910 also includes an integral proximal end-capping feature and an integral distal end-capping feature both with openings at both of two ends of the noise suppression device 900. It is evident that the openings of the end-capping features are centered along a longitudinal axis C-C in a bore through the noise suppression device 900 though which a fired bullet or projectile travels.

As previously described, the noise suppression device 900 can be configured to attach directly to a firearm or be used in conjunction with a first stage noise suppression device. As shown in FIG. 9, the noise suppression device 900 includes female threads as one example of an attachment mechanism 915 that is used to attach the noise suppression device 900 to a firearm or a first stage noise suppression device.

In accordance with the fifth exemplary embodiment, the integral core 920 is a trabecular structure. That is, as shown in FIG. 9, the core 920 is made of a random framework of small holes or porous features that are all connected by a series of bars, rods, fibers, or beams that bridge together and extend through the core 920 and are connected to the interior portion of the body 910.

The trabecular structure of the core 920 of the noise suppression device 900 for a firearm results in several benefits. First, the random porous nature of the trabecular framework of the core 920 causes increased internal turbulence and gas trapping to disrupt the flow of the bullet propellant gases through the noise suppressor 900. Increased turbulence and trapping will slow down the propellant gas exit from the noise suppression device 900. Slowing down and dispersing propellant gases is one method effectively contributing to noise suppression in firearms. This also has the effect of reducing blowback or a rebound of propellant gases in the direction of the shooter.

Second, the connecting and bridging structures of the trabecular framework creates a relatively large concentration of material surface area. Larger amount of material surface area allows increased heat absorption to lower the temperature of propellant gas, which is an effective noise suppression method, as previously discussed. A trabecular core allows for a larger amount of surface-to-volume of material than a same-sized suppressor made with conventional baffles. Unlike conventional ablative materials and techniques that are used to increase internal material surface area, the trabecular core of the present exemplary embodiment of the present invention is much more robust and will have a longer lifetime.

Third, the trabecular core 920 increases strength, rigidity, and durability of the noise suppression device 900. The nature of the trabecular framework of the core distributes stress within the core 920 and transfers mechanical loads from the core 920 to the body 910. The trabecular architecture increases rigidity throughout the noise suppression device 900. Further, the elastic properties of the trabecular framework allow the core 920 to absorb and transfer concussive force of the muzzle blast. This property reduces catastrophic failures compared to conventional suppressor designs. There is less fatigue developed with the distributed trabecular framework that has a greater ability to withstand repetitive high magnitude impulse forces created in short times.

Fourth, because of the relative high strength-to-material volume in the trabecular core 920, a total weight saving is achieved in the noise suppression device 900 as compared to a conventional suppressor with similar strength and rigidity.

In accordance with the present exemplary embodiment of the present invention, the noise suppression device 900 is preferably manufactured as a single monolithic unit using three-dimensional (3-D) printing techniques as previously described. The noise suppression device 900 can be made from plastic, metal, alloys, fiber, composite materials, or combinations thereof using a 3-D printing process. Further, the resulting monolithic unit can be subject to secondary processing to subtract material to form features such as the bore and attachment mechanism 915.

Figure 11:
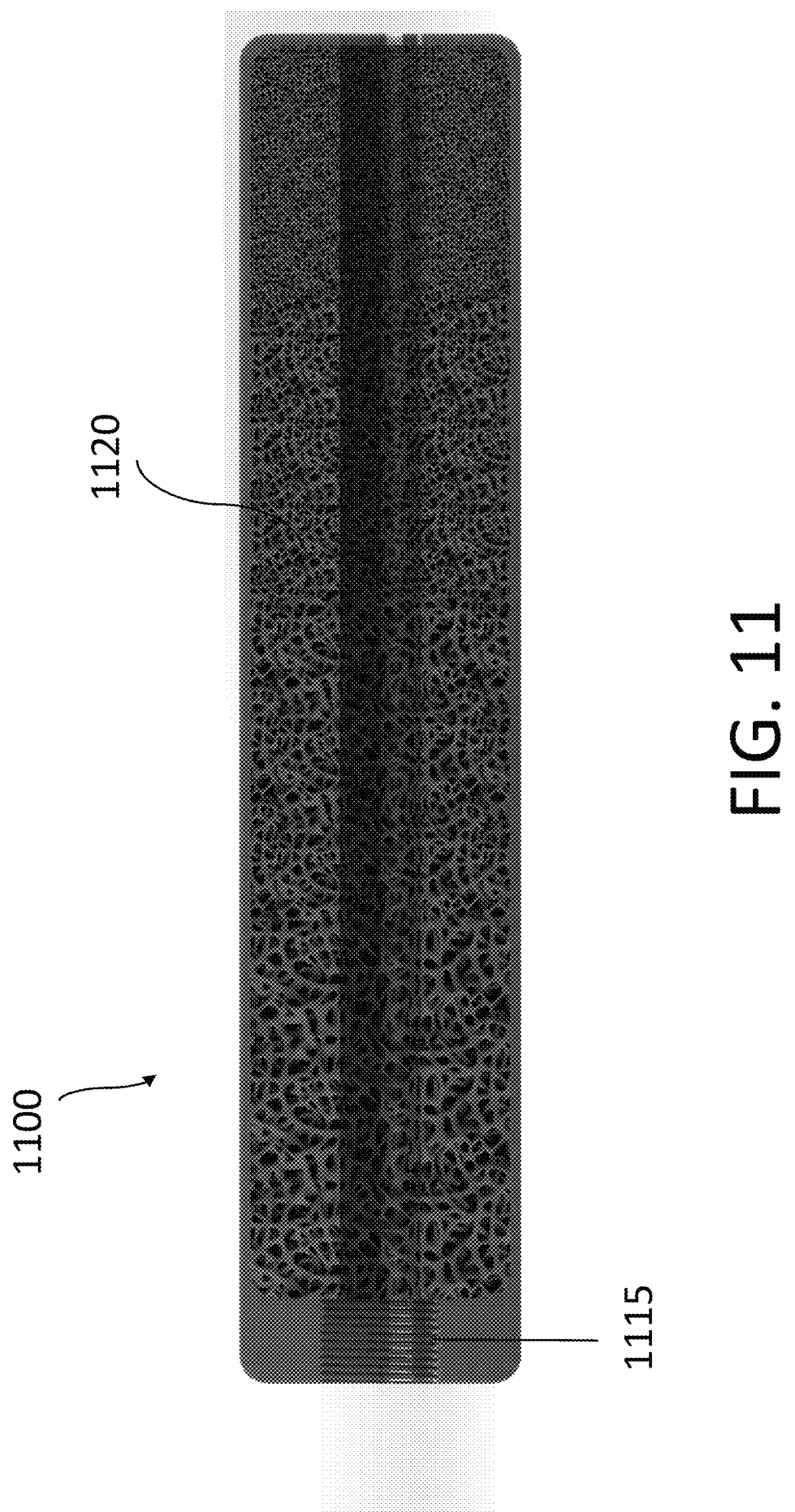
FIGS. 11, 12, 13, and 14 are longitudinal section views of a noise suppressor for a firearm that illustrates varying densities of core structure in a lateral direction.

Alternative to a core 920 with a trabecular structure with uniform density shown in FIGS. 9 and 10, in another exemplary embodiment of the present invention, the noise suppressor 1100 illustrated in FIG. 11 includes a core 1120 with varying structural density. That is, the amount of bridging connections within the trabecular structure per volume and size of the holes or spaces between the bridging connections can change through the core 1120. For example, the trabecular structure of the core 1120 shown in FIG. 11 is less dense in the proximal end toward the attachment mechanism 1115 and denser toward the distal end away from the attachment mechanism 1115. FIG. 11 illustrates a core 1120 with a gradual trabecular structure density change from one end to the other end. One of ordinary skill in the art would appreciate that the density change of the trabecular structure in the core 1120 need not be gradual in only one direction, but can be varied by design based on performance needs, suppressor material, caliber and parameters of the bullet, size of the suppressor, and other factors.

Figure 12:
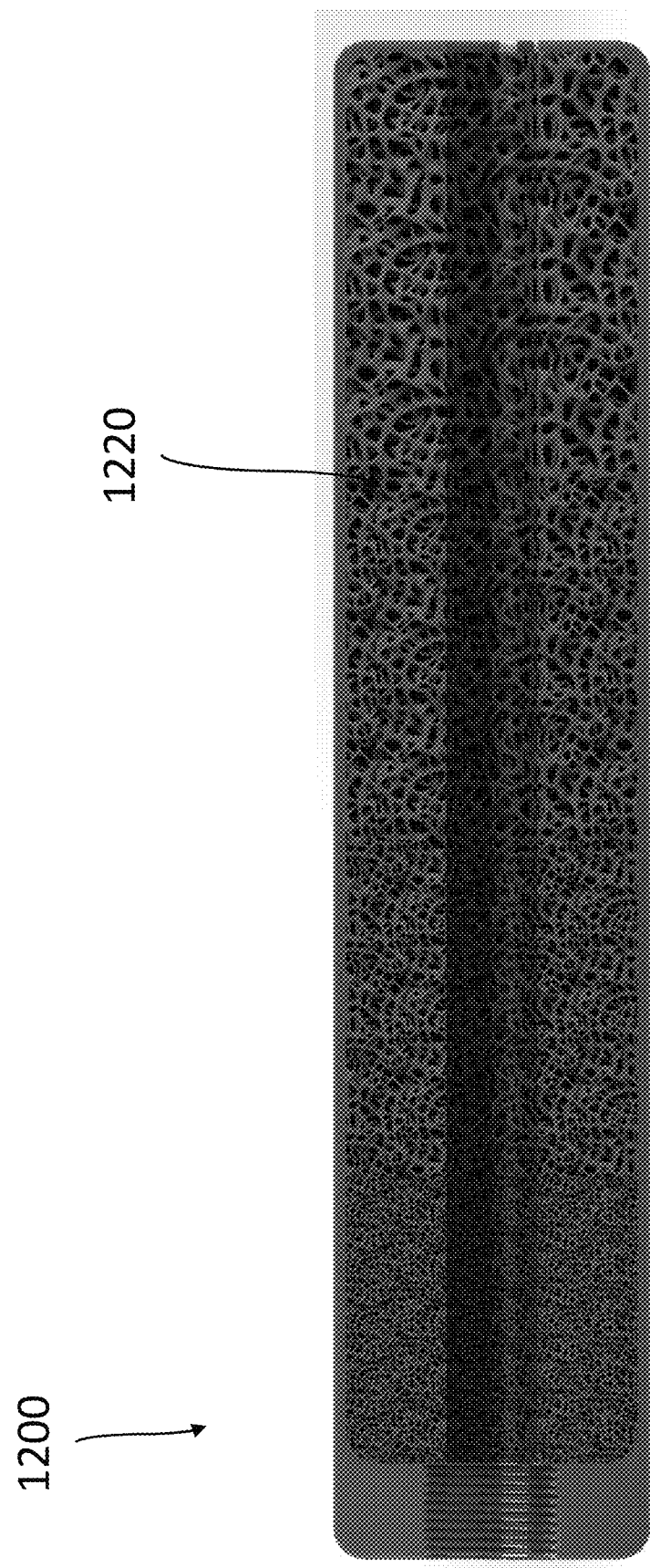

For example, the noise suppressor 1200 illustrated in FIG. 12 includes a core 1220 with a gradual trabecular structure density change opposite to that shown in FIG. 11. In FIG. 12, the core 1220 is less dense at the distal end and denser at the proximal end adjacent to the attachment mechanism.

Figure 13:
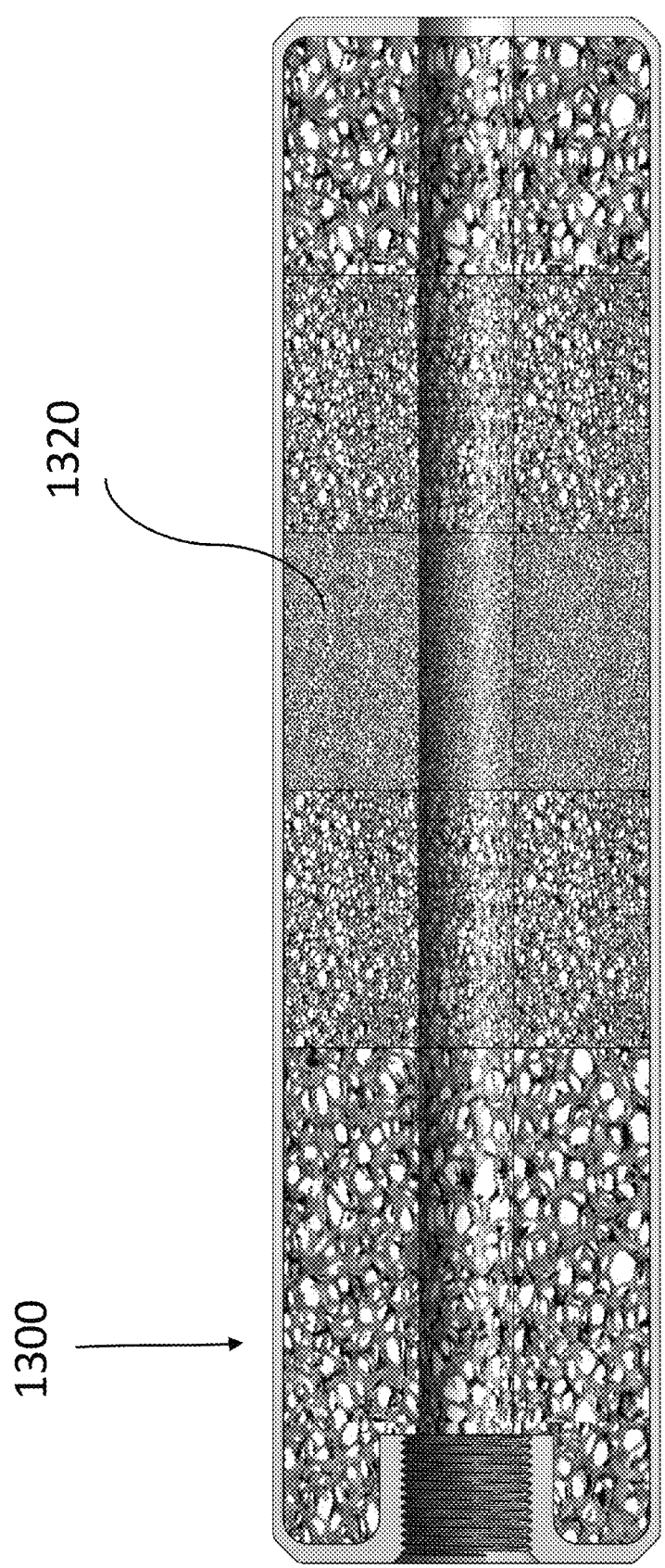
Figure 14:
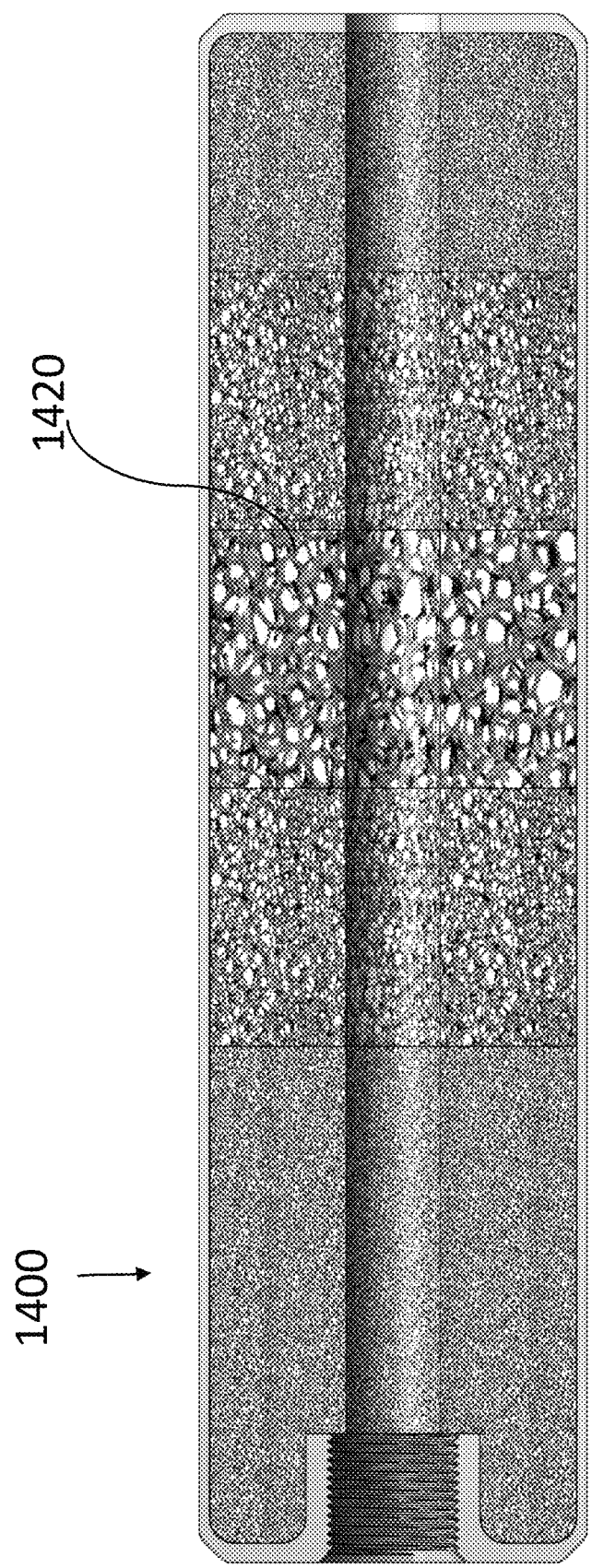

In another aspect of a trabecular structure density change, FIG. 13 shows that the density of the core 1320 in the noise suppressor 1300 is less dense at both the proximal and distal ends and denser in the middle portion between the proximal and distal ends. Alternatively, as shown in FIG. 14, the density of the core 1420 in the noise suppressor 1400 is less dense in the middle portion and denser at the proximal and distal ends. Thus, the trabecular structure density can oscillate through the core.

Figure 15:
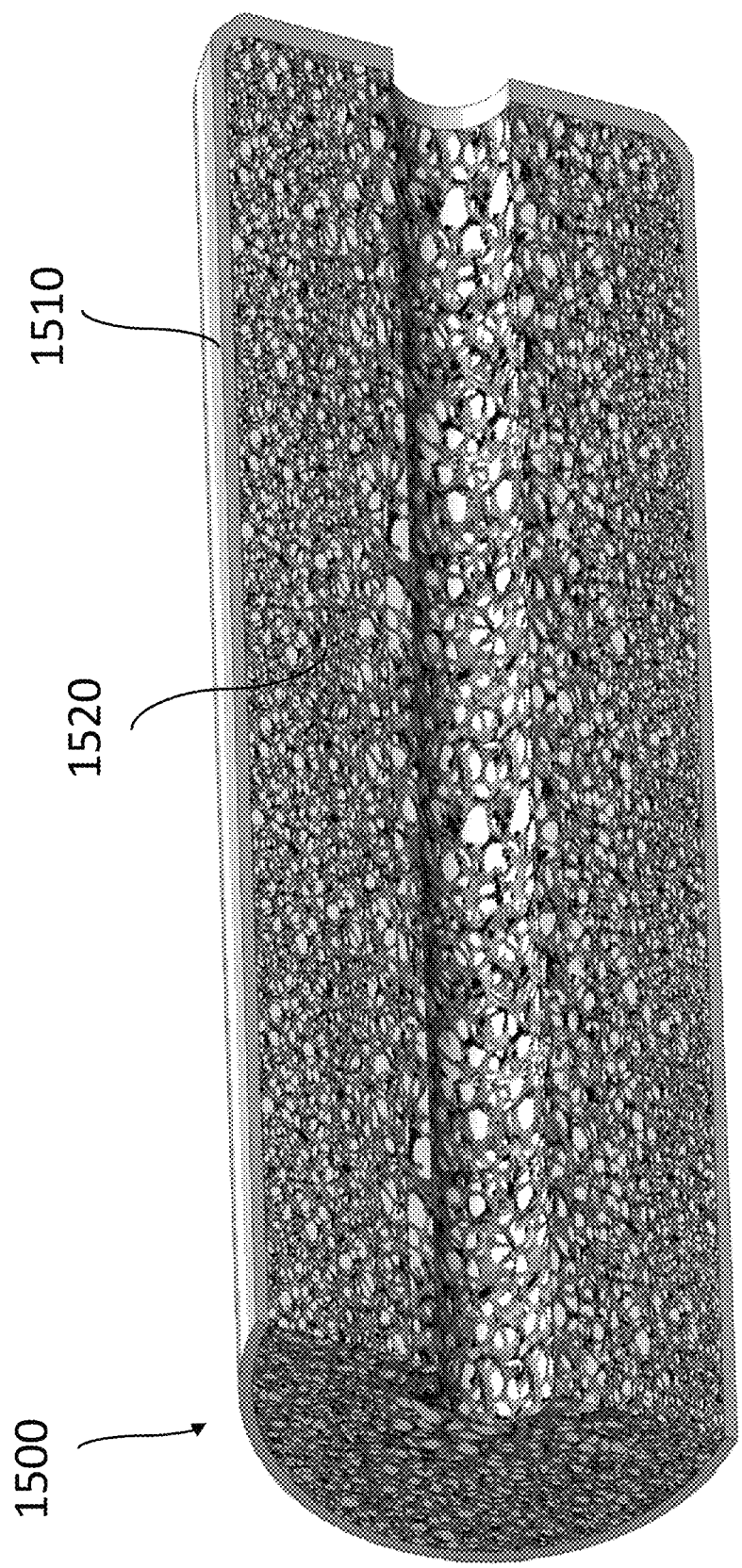
FIGS. 15 and 16 are longitudinal section views of a noise suppressor for a firearm that illustrates varying densities of core structure in a radial direction.
Figure 16:
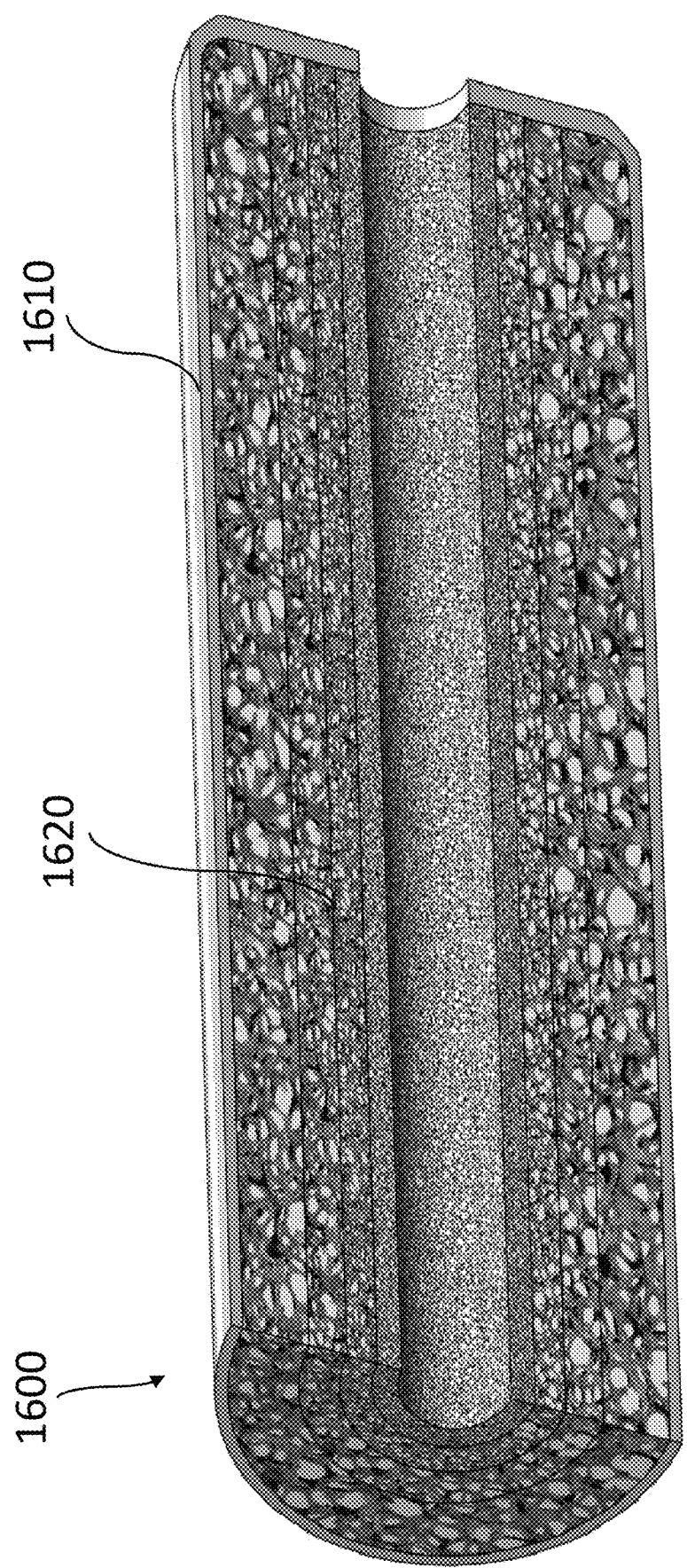

In another aspect of a trabecular structure density change, FIG. 15 shows that the density of the core 1520 in the noise suppressor 1500 is less dense at the bore and denser in a radial direction closer to the internal portion of the body 1510. Alternatively, as shown in FIG. 16, the density of the core 1620 in the noise suppressor 1600 is less dense at the internal portion of the body 1610 and denser along a radial direction closer to the bore.

As one of ordinary skill in the art would appreciate, many variations of trabecular structure density are possible and the variation of density may not be gradual. Alternatively, the trabecular structure density can change abruptly or may be omitted entirely in lateral sections defining chambers in the core.

Figure 17:
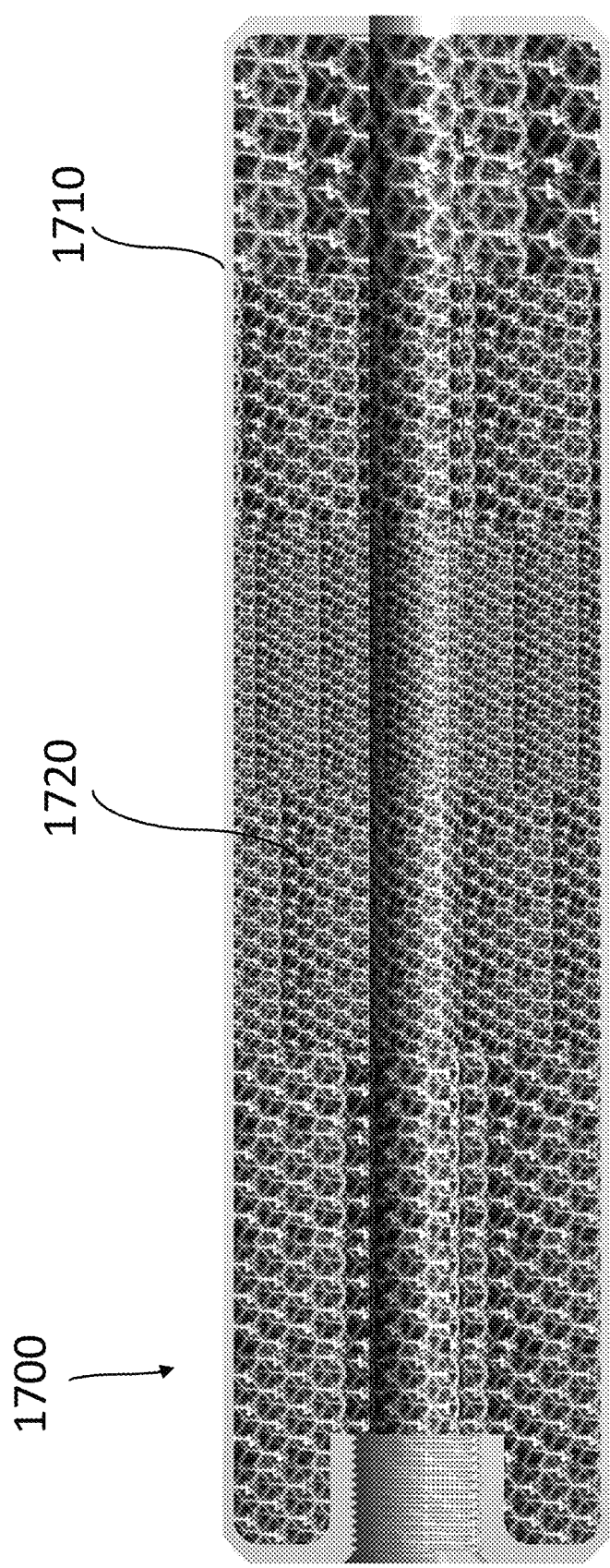
FIG. 17 is a longitudinal section view of a noise suppressor for a firearm, in accordance with a sixth exemplary embodiment.

FIG. 17 illustrates a longitudinal section view of a monolithic noise suppression device 900, in accordance with a sixth exemplary embodiment. As one of ordinary skill in the art would understand, the sixth exemplary embodiment illustrated in FIG. 17 can include many of the same features as previously described with respect to other exemplary embodiments. For brevity, descriptions of these common features will be omitted.

In accordance with the sixth exemplary embodiment, the integral core 1720 includes a geometric lattice structure. This is similar to the trabecular structure core as described with respect to the fifth exemplary embodiment except that the same lattice structure is continually repeated throughout the core 1720 and is not random. That is, as shown in FIG. 17, the core 1720 includes a repeating geometric framework of small holes or porous features that are all connected by a series of bars, rods, fibers, or beams that bridge together and extend throughout the core 1720 and are connected to the interior of the body 1710.

As one of ordinary skill would readily appreciate, a noise suppressor with a lattice structure included in the core can achieve the same or similar benefits to those previously described with respect to a trabecular structure. An additional benefit to a lattice structure core is that as the lattice is not random, but specifically selected and structured, variations of noise suppression performance or manufacturability within the same design can be more controlled.

In addition, as one of ordinary skill in the art would readily appreciate, a lattice structure can include varying densities as described above with respect to the trabecular structure core. For example, FIG. 17 shows varying densities of the lattice structure in the core 1720 in different lateral sections of the core 1720.

Figure 18:
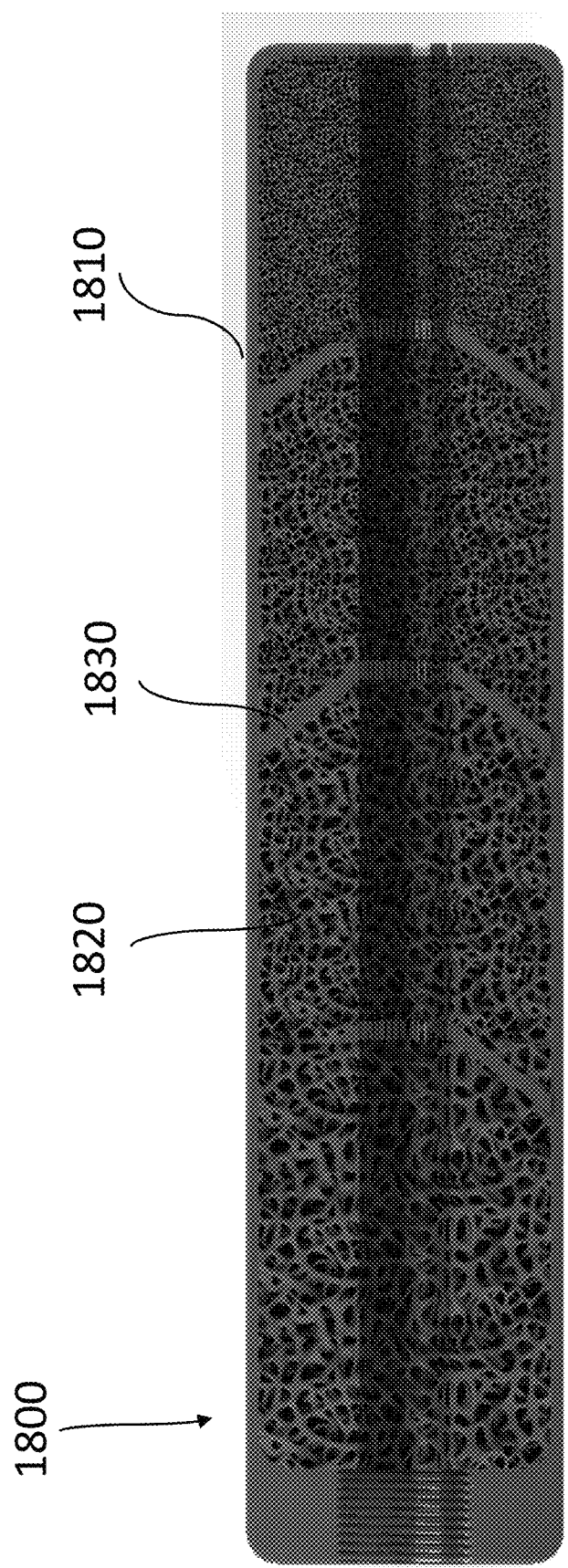
FIG. 18 is a longitudinal section view of a noise suppressor for a firearm, in accordance with a seventh exemplary embodiment.

FIG. 18 illustrates a longitudinal section view of a monolithic noise suppression device 1800, in accordance with a seventh exemplary embodiment. As one of ordinary skill in the art would understand, the seventh exemplary embodiment illustrated in FIG. 18 can include many of the same features as previously described with respect to other exemplary embodiments. For brevity, descriptions of these features will be omitted.

In accordance with the seventh exemplary embodiment, a noise suppressor 1800 with an integral core 1820 can include a combination of baffles 1830 and a trabecular structure or a lattice structure between the baffles 1830. As one of ordinary skill in the art would understand, a core 1820 of the seventh exemplary embodiment can include any combination of chambers, baffles, trabecular structures, and lattice structures as described above with respect to the previous exemplary embodiments. For example, FIG. 18 shows the noise suppressor 1800 with the core 1820 including three baffles 1830 and a trabecular structure between the baffles 1830 that varies in density with less density toward the proximal end and more density at the distal end.

In accordance with an eighth exemplary embodiment, a monolithic noise suppressor can include features for recoil compensation. Considering conservation of energy principles, a force used to propel a bullet forward requires force to be applied in the opposite direction. Recoil is the kickback or reaction of a firearm caused by a reverse force when fired. Most firearms tend to recoil or kick upward upon firing because the longitudinal axis of the barrel is physically above the point(s) of contact of the firearm to the shooter. Firing forces the firearm backward and the backward force is physically absorbed by the shooter causing potentially pivoting at the wrist, shoulder, or waist with a resulting upward movement of the barrel. The purpose of recoil compensation is to redirect propellant gases to counter recoil and unwanted rising of the barrel of a firearm when fired. Less recoil leads to increased shooter comfort, faster target acquisition, and increased accuracy of repeated firing.

Adding a noise suppressor to the muzzle of a barrel will add mass, increasing the firearm inertia by moving the center of mass forward, which will reduce recoil and muzzle rise during firing. Including features for recoil compensation into a noise suppressor will additionally reduce recoil and muzzle rise. Compensation features redirect and control the propellant gases to exert a downward force at the muzzle of the barrel to compensate the upward force of recoil.

Figure 19:
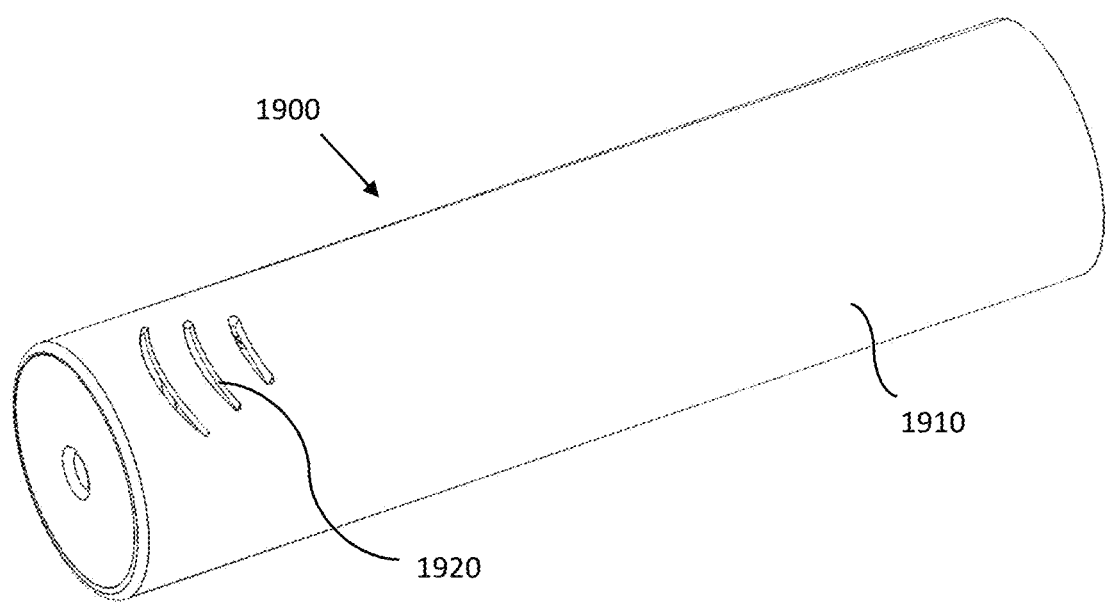
FIGS. 19, 20, and 21 are perspective views of noise suppressors with compensation features, in accordance with an eighth exemplary embodiment of the present invention.
Figure 20:
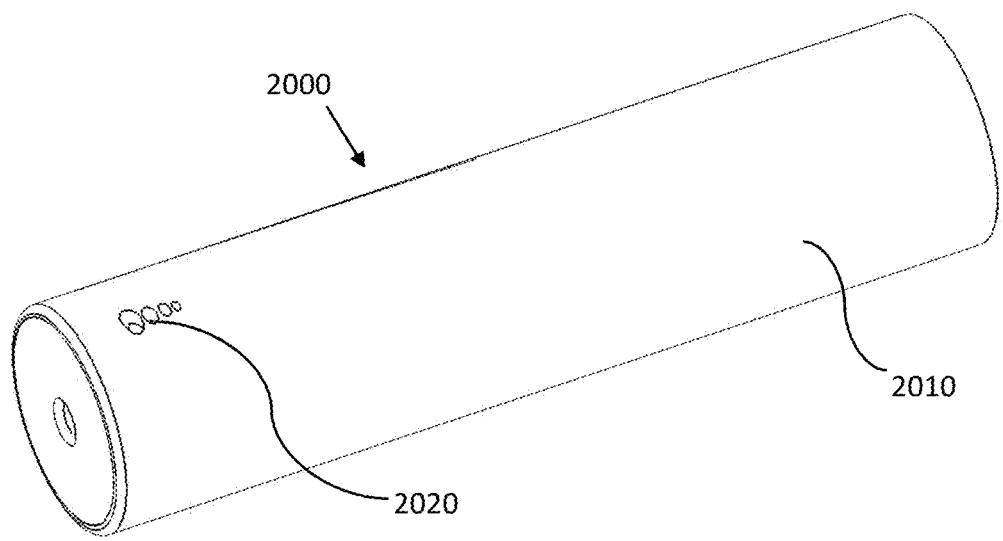
Figure 21:
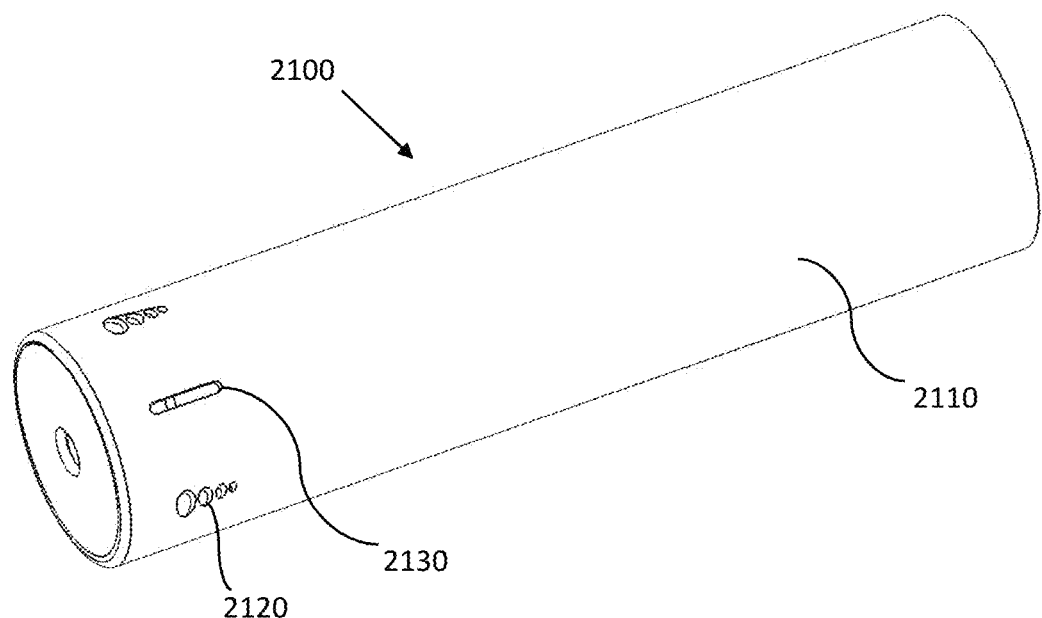

FIGS. 19-21 are perspective views of monolithic noise suppressors with compensation features in a portion of the body between the ends of the monolithic noise suppressors according to the eighth exemplary embodiment of the present invention. The compensation features shown in FIGS. 19-21 are all openings in the body of the noise suppressors. The openings connect the internal portion of the noise suppressor to the exterior through the external surface of the body. The openings intentionally allow propellant gas to exit the noise suppressor at a location other than the exit opening of the bore away from the barrel. Typically, the compensation features will direct or allow propellant gas to exit upward to compensate an upward recoil force, but directing propellant gas in different directions is possible. When installed on a muzzle of a barrel of a firearm, a noise suppression device including compensation features will be oriented so that the compensation features are directed as intended. It is also understood that the addition of compensation features may have an adverse effect on noise suppression, and that various configurations of noise suppression and compensation features are possible to achieve varying degrees of noise suppression and recoil compensation.

FIG. 19 shows a noise suppressor 1900 including a body 1910 and compensation features 1920. The compensation features 1920 can include a series of apertures or slots at the end of the body 1910 where the bullet exits the noise suppressor 1900. As shown in FIG. 19, the compensation features 1920 can include three slots, although other numbers of slots are possible, in the circumferential direction of the body that is generally perpendicular to the longitudinal axis and to the radial direction of the bore. The slots can be curved or straight. Although the slots can be the same length, FIG. 19 shows that the length of the three slots are different from each other. Although the width of the slots can be different from each other, FIG. 19 shows that the width of the slots can be the same. That is, multiple combinations of number, length, width, and location of slots in the body 1910 are possible.

FIG. 20 shows a noise suppressor 2000 including a body 2010 and compensation features 2020. The compensation features 2020 can include a series of holes at the end of the body 2010 where the bullet exits the noise suppressor 2000. As shown in FIG. 20, the compensation features 2020 can include three holes along the longitudinal axis of the bore, although other numbers of holes are possible. The holes may be round or elliptical and may be located in an arrangement not along the longitudinal axis of the bore. Although the holes can have the same diameter, FIG. 20 shows that the diameters of the three holes are different from each other. That is, multiple combinations of number, diameter, and locations of holes are possible.

FIG. 21 shows a noise suppressor 2100 including a body 2110 and compensation features 2120 and 2130. The compensation features 2120 can include a series of holes at the end of the body 2010 where the bullet exits the noise suppressor 2100, as described above. As shown in FIG. 20, the compensation features 2130 can include a slot along the longitudinal axis of the bore. That is, FIG. 21 shows more than one compensation feature can used in different geometric configurations and at different locations.

The compensation features can be added after the monolithic noise suppressor is fabricated or incorporated during manufacturing. For example, the slots and/or holes of the compensation features can be defined by cutting, drilling, or machining in a pre-made monolithic suppressor. Alternatively, the slots and/or holes can be programmed as features as part of a 3D printing process.

In accordance with a ninth exemplary embodiment, a noise suppressor with a one-piece body and core structure can include a separate endcap. An endcap can be a component fabricated separately from the one-piece suppressor body, chamber, and baffle structure previously described.

An endcap can be fabricated by casting, molding, machining, bonding, fastening, 3D printing, combinations thereof, or the like and can include multiple components. The endcap can be located at one or both ends of the tubular body of the noise suppressor and is primarily used to retain the propellant gas within the body of the suppressor. The endcap can be permanently attached to the body of the one-piece noise suppressor or made to be removable and replaceable. If removable, the endcap can be removed to inspect and to clean the internal monolithic noise suppressor structure. Additionally, the endcap can be replaced if damaged by physical abuse or wear with an endcap with the same or different features. Also, the endcap can perform additional functions and enhance flexibility of a single monolithic noise suppressor.

In an exemplary embodiment, the endcap can be at the proximal end of the one-piece noise suppressor body and core and used to mechanically attach or mount the suppressor directly to a barrel of a firearm or to a first stage. That is, the endcap can include features such as threads that provide screw mounting, radial pins or slots that provide bayonet or quick-attach mounting, a tapered diameter that provides ring mounting, or the like.

Figure 22:
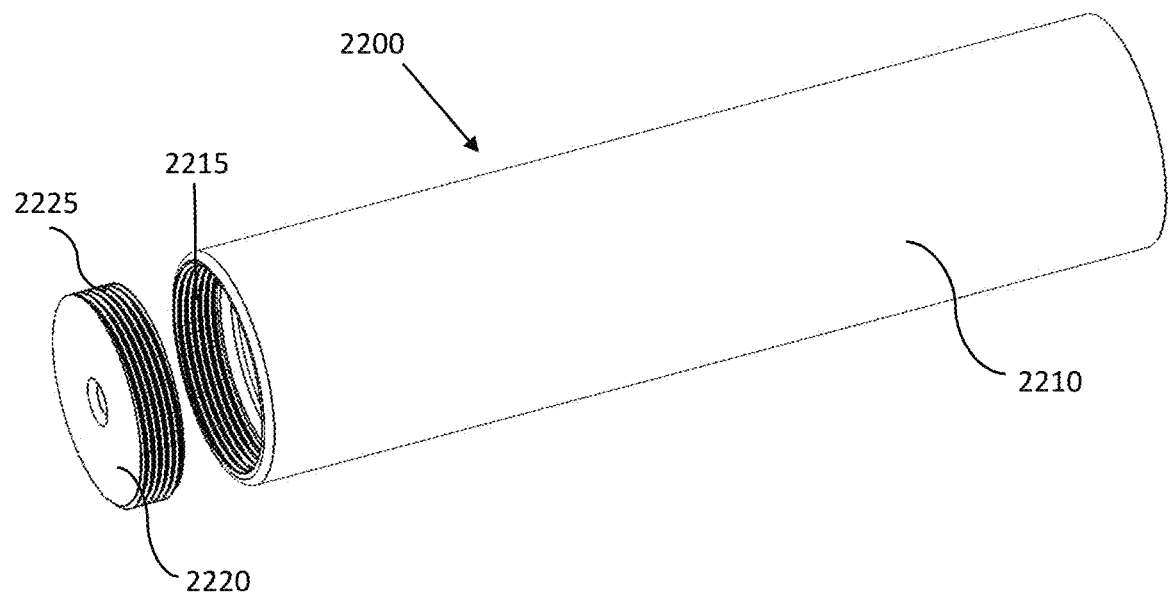
FIG. 22 is a perspective view of a noise suppressor and end cap, in accordance with a ninth exemplary embodiment of the present invention.
Figure 23:
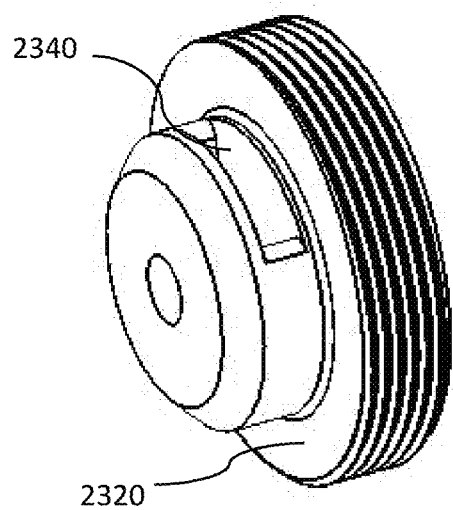
FIGS. 23 and 24 are perspective views of end caps, in accordance with the ninth exemplary embodiment of the present invention.
Figure 24:
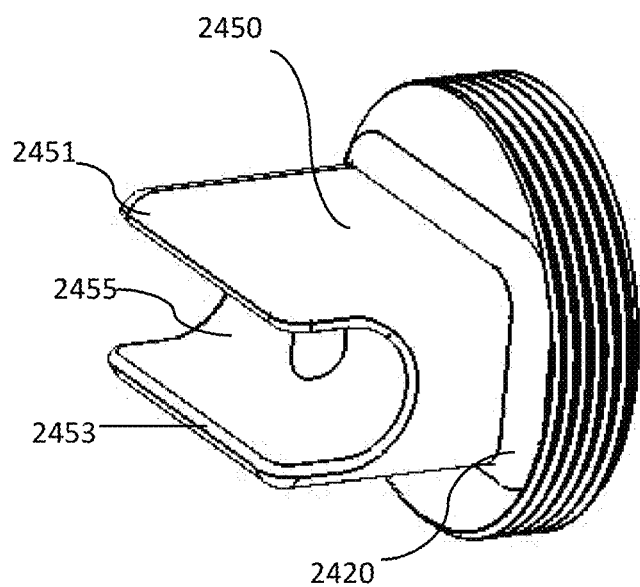

FIGS. 22-24 are perspective views of monolithic noise suppressors with different endcaps according to a ninth exemplary embodiment of the present invention. FIG. 22 shows a monolithic noise suppressor 2200 including a body 2210 and an endcap 2220. As shown in FIG. 22, the endcap 2220 is at the distal end of the monolithic noise suppressor 2200, away from the barrel, and includes threads 2225. As shown, the threads 2225 are used to screw the endcap 2220 into corresponding mating threads 2215 of the body 2210, although other methods of attachment are possible.

FIG. 23 is a view of an end cap 2320 including compensation features 2340. As shown in FIG. 23, the endcap 2320 includes a slot 2340 that can be oriented in any of 360-degree positions around the circumferential direction of the barrel to compensate a firearm in the manner discussed above. Although a slot 2340 is shown as the compensation feature, other features such as additional slots, openings, or holes, as discussed above, can be in included in the endcap 2320.

Optionally, the endcap can include features configured for breaching, entrenching, or spearing. Such features can take advantage of the leverage provided by a length of the firearm and suppressor to provide a mechanical advantage to a user. This can allow a user quick access to the feature or to carry one less piece of gear or mission specific accessory. For example, FIG. 24 is a view showing an end cap 2420 including a cutting feature 2450. The cutting feature 2450 shown in FIG. 24 includes two opposing blades 2451 and 2453 and a rounded section 2455, although other configurations are possible. The cutting feature 2450 can be used to twist, move, or cut material such as fencing, razor or barbed wire, cordage, electrical wire, or the like by placing the material to be breached in the rounded section 2455 between the opposing blades 2451 and 2453 and pushing or twisting against the material with the firearm. Alternatively, an endcap can include other features configured for breaching including a hammer, a battering ram, a pry bar, a hinge breaker, a hinged shear, or the like. Alternatively, an endcap can include other features configured for entrenching including a rake, a shovel or spade blade, a hatchet, a serrated or toothed cutting blade, or the like.

As previously discussed, noise suppression devices reduce the noise by slowing the propellant gas, thus allowing the propellant gas to expand more gradually and cool before it collides with the air in and around the muzzle of the firearm. Thus, noise suppression devices absorb heat and become less efficient with repeated use before they can cool. Therefore, it is desirable to include features that can more rapidly cool noise suppression devices.

Figure 25:
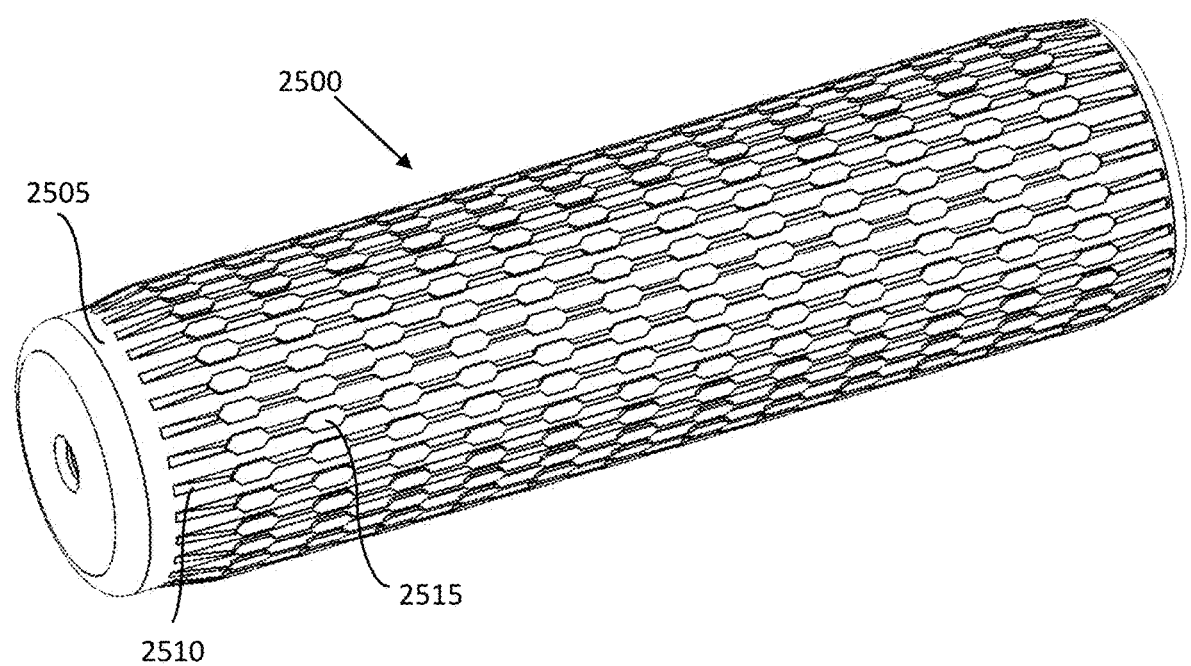
FIG. 25 is a perspective view of a noise suppressor with cooling features, in accordance with a tenth exemplary embodiment of the present invention.
Figure 26:
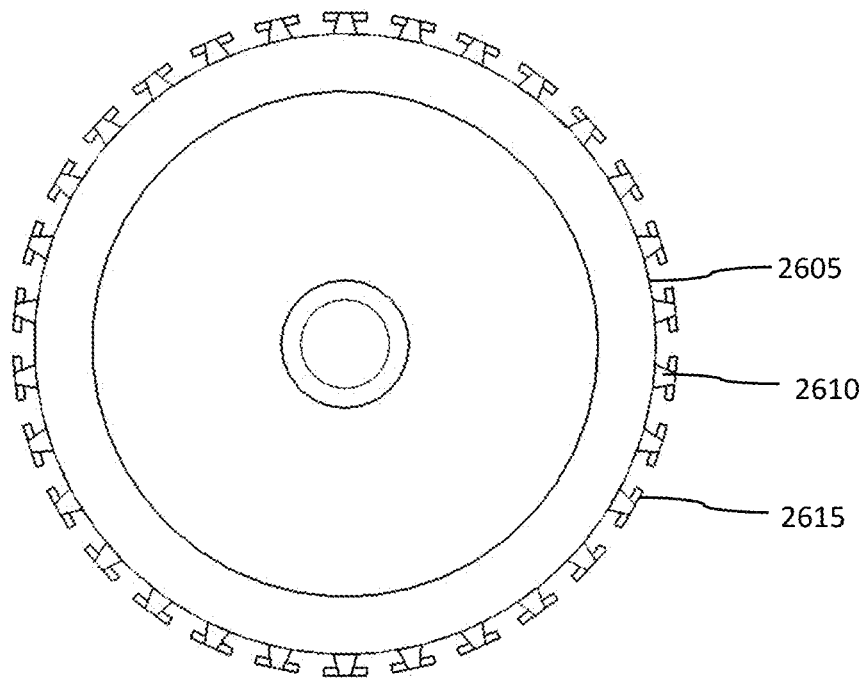
FIGS. 26 and 27 are section views of noise suppressors, in accordance with the tenth exemplary embodiment of the present invention.
Figure 27:
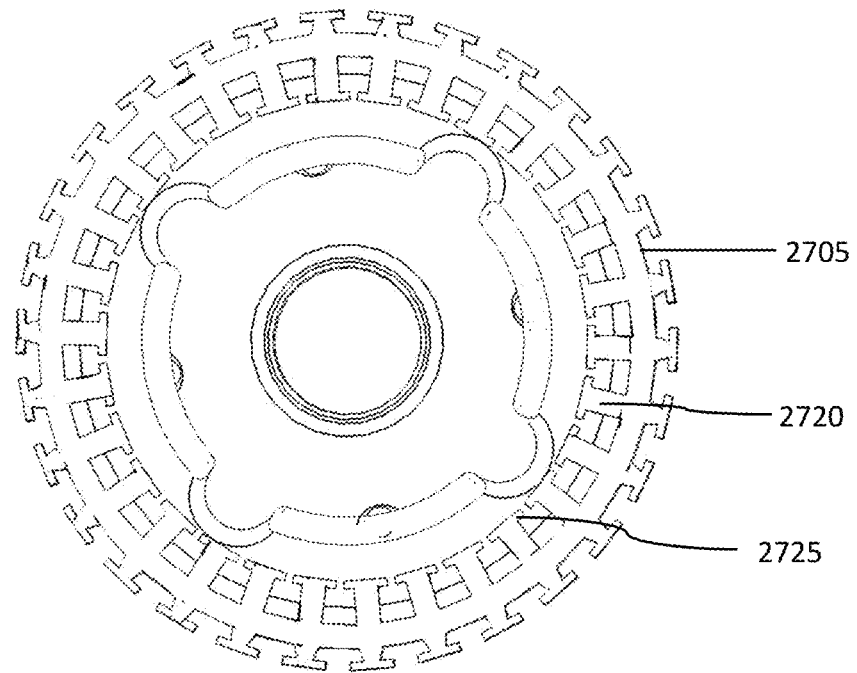

FIGS. 25-27 are views of a monolithic noise suppressor with cooling features according to a tenth exemplary embodiment of the present invention. FIG. 25 is a perspective view of a monolithic noise suppressor with exterior spines and fins. FIG. 26 is a view of a cross section of a monolithic noise suppressor similar to that shown in FIG. 25. FIG. 27 is a view of a cross section of a monolithic noise suppressor similar to that shown in FIG. 25 that additionally includes spines and fins on the interior side of the body.

As shown in FIG. 25, the monolithic noise suppressor 2500 can include a plurality of spines 2510 and fins 2515 protruding from the exterior wall of the body 2505 to increase the surface area of the monolithic noise suppressor 2500 and to help in more rapidly dissipating heat absorbed from the propellant gas and cooling the device. FIG. 25 shows that the spines 2510 can extend in a longitudinal direction along the length of the monolithic noise suppressor 2500. As shown, the spines 2510 can extend substantially along the entire length of the monolithic noise suppressor 2500. Also as shown, the fins 2515 can be plate-shaped structures that are located at intervals along the length of the plurality of spines 2510.

The cross section view of FIG. 26 shows that the spines 2610 protrude substantially straight out from the body 2605. In FIG. 26, the cross section of the spines 2610 is shown as a frustoconical shape, although other profile shapes are possible. The spines 2610 are shown as spaced at regular intervals around the diameter of the cylindrical body 2605, although irregular spacing is possible.

The cross section view of FIG. 26 shows that the fins 2615 are integral with and located at the top of the spines 2610. FIG. 26 shows that the fins 2615 are substantially perpendicular to the corresponding spine 2610 and that an air gap is created between the bottom surface of the fin 2615 and the body 2605. Additionally, there are spaces between fins 2615 of adjacent spines 2610 to allow air flow between adjacent spines 2610 and fins 2615. Although other shapes and configurations of spines 2610 and fins 2615 are possible, the added surface area and spacing significantly increases external surface area and cooling of the monolithic noise suppressor.

Additionally, as shown in FIG. 27, the monolithic noise suppressor can include a plurality of spines 2720 and fins 2725 protruding from the interior wall of the body 2705 to increase the surface area of the monolithic noise suppressor. FIG. 27 shows that, similar to the exterior spines, the spines 2720 on the interior protrude substantially straight out from the body 2705. In FIG. 27, the cross section of the spines 2720 is shown as a rectangular shape, although other profile shapes are possible. The spines 2720 are shown as spaced at regular intervals around the diameter of the cylindrical body 2705, although irregular spacing is possible. As such, the internal spines 2720 and fins 2725 are located in chambers between baffles.

The cross section view of FIG. 27 shows that the fins 2725 are integral with and located at the top of the spines 2720. FIG. 27 shows that the fins 2725 are substantially perpendicular to the corresponding spine 2720 and that an air gap is created between the bottom surface of the fin 2725 and the interior of the body 2705. Additionally, there are spaces between fins 2725 of adjacent spines 2720 to allow air flow between adjacent spines 2720 and fins 2725. Although other shapes and configurations of spines 2720 and fins 2725 are possible, the added surface area and spacing significantly increases internal surface area and cooling of the monolithic noise suppressor.

FIG. 27 shows that for every exterior spine there is a corresponding interior spine 2720. However, a one-to-one relationship between exterior spines and interior spines 2720 is not required, and multiple configurations are possible.

As previously discussed, noise suppression is achieved through the cooling and slowing of the hot propellant gas that is generated when a round is fired from a firearm. The cooling and slowing process can be achieved in multiple ways, primarily through heat transfer from the propellant gas to the body of a suppressor, controlling the expansion of the gas, and disrupting the gas pathway to slow the propellant gas. Conventional noise suppressors are limited in size and volume depending on the firearm caliber used because they are closed pressure vessels. By allowing the walls and/or internal structures to "breathe" by constructing a noise suppressor with purposely induced porosity (PIP), noise suppressor design is not constrained in the same manner as conventional noise suppressors because pressures inside the noise suppressor are significantly reduced. This pressure reduction using PIP can be introduced into minute areas or expansive areas of a noise suppressor, which are variable by design.

Purposely induced porosity is a feature of a noise suppressor structure where porosity features of the material used to make the suppressor are intentionally built into the suppressor. Although it may be possible to construct a one-piece monolithic noise suppressor with multiple materials, a single material or compound is more typical due to the manufacturing constraints and mechanical weaknesses generated at interfaces of different materials. Industry standards generally govern the determination of properties such as strength, density, heat capacity, and thermal conductivity of a given material. However, strength, density, heat capacity, and thermal conductivity of a noise suppressor can be changed by altering the porosity, a fraction of the volume of pores per volume of mass, in the material of the noise suppressor.

Porosity of the noise suppressor material can be changed by changing pore sizes or changing the number of pores (pore density) in a volume. The relationship of porosity, pore size, and pore density is such that as the porosity increases by increasing the size of the pores for a given volume, the density of the pores (number of pores per volume) can stay the same up to the point that the material can no longer support the pores without breaking down. At this point, the material walls of the pores must be thick enough to sustain the pores, and as the size of the pores continue to increase, the density or number of pores for the same volume has to decrease. That is, when the porosity is as close to 100% as possible, given some minimum material wall thickness that creates the pores, the pore density would be one (1) in that volume. The porosity and pore density can also be manipulated by changing the number of pores with different sizes.

Porosity, pore size, and pore density can be predetermined and built into a monolithic noise suppressor by changing the design and parameters of 3D printing techniques such as, printing method, energy source type, energy source exposure, energy source power, gas flow, material, base material particle size, and material application. These parameters can be selected and programmed to affect melt pool geometry, material vapor flow, and ambient gas pressure to create desired gas pockets to generate desired porosity features. Furthermore, these parameters can be changed throughout the printing process to generate different porosity features at different portions of the noise suppressor.

Providing the walls and internal structures of the noise suppressor to be porous also provides far superior heat distribution versus a conventional suppressor made with the same material. The ability to essentially generate a desired porosity at any given area or a section of a noise suppressor provides design flexibility to create areas with structures that have very small features with a high surface area, or very dense features with a low surface area. Altering the porosity and surface area for a given material will affect the amount of heat absorption that each particular area will have upon contact with the hot propellant gas exerted by each fired round. By fine-tuning each section of a noise suppressor based on its wall thickness, porosity, and location in the suppressor, heat distribution can be optimally balanced. Even heat distribution is a major improvement over the functionality of a conventional noise suppressor because it removes a major failure point of conventional suppressors where heat is disproportionally absorbed and retained most often in the blast baffle/expansion chamber area of the suppressor closest to the barrel. Repeated overheating generates stress and fatigue that can lead to a catastrophic failure in the body of a noise suppressor due to material weakness.

Another major advantage of PIP is the near total elimination of blowback of the propellant gas toward the eyes and face of the shooter. In a conventional suppressor that is a solid pressure vessel with a fixed space volume until the bullet leaves the distal end, there is only a limited space that the propellant gas can occupy. This situation can lead to excess propellant gas being violently forced backwards through the action of the firearm, directly into the facial area of the shooter. Blowback of propellant gas is extremely detrimental to the proper continued use and aiming of the firearm, as the propellant gas's heat and chemical composition will cause burning and obscured vision. However, a noise suppressor with PIP is not constrained to a fixed space volume because it is no longer a solid pressure vessel. Excess pressure and gas while the space volume of the noise suppressor is fixed, i.e, in the time frame in which the bullet is blocking the advancement of the propellant gas from escaping the noise suppressor, are allowed to exit through pores created in the surfaces of the suppressor body instead of back through the action of the firearm toward the shooter.

The ability to balance pressure and heat distribution in a noise suppressor, is another advantage of PIP. By being able to define the porosity of the surfaces of the noise suppressor body and internal structures independently to a desired degree, there are essentially unlimited possibilities in terms of how to design localized pressure and heat absorption in a noise suppressor. For example, a design for the expansion chamber/blast baffle area could include an extremely porous wall of the expansion chamber area and a dense blast baffle, thus forcing all of the propellant gas immediately forward to exit out of the noise suppressor. In another option, the wall of the expansion chamber area and the blast baffle can have a medium porosity, allowing some propellant gas to exit the noise suppressor through the wall and also allowing some gas to continue its forward path into the further chambers and out of the noise suppressor. In another option, the wall of the expansion chamber area can be made very dense and the blast baffle very porous, thus forcing all propellant gas forward towards the exit of the noise suppressor while the internal features allow the gas alternate paths of escape. These examples only describe what is possible in the portion of the noise suppressor closest to the barrel, and mixing and matching porosities can be provided in all areas of the noise suppressor, allowing for extreme fine tuning. Additionally, porosity can be increased near the top distal end of the body of the noise suppressor to vent propellant gas to mitigate recoil and achieve the benefits of compensation discussed above.

Figure 28:
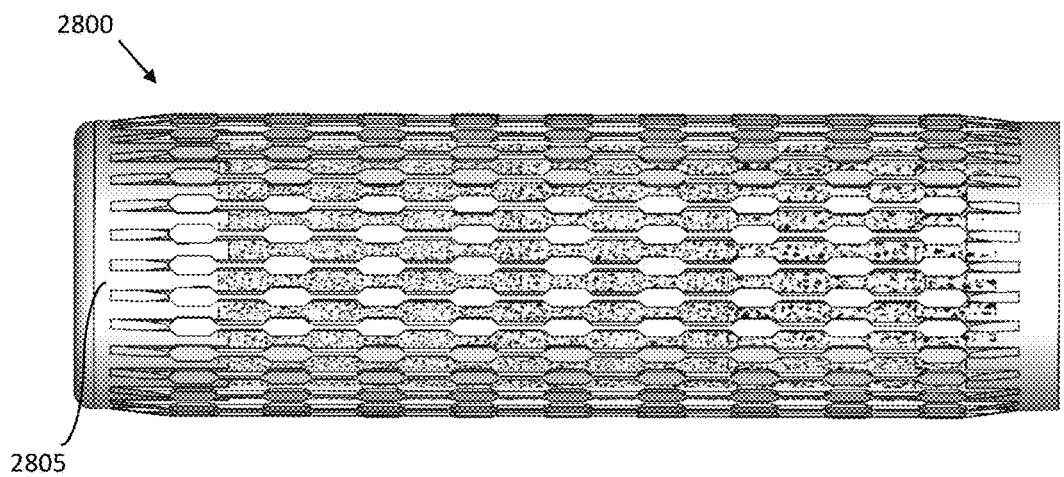
FIG. 28 is a side view of a noise suppressor with porosity features, in accordance with an eleventh exemplary embodiment of the present invention.
Figure 29:
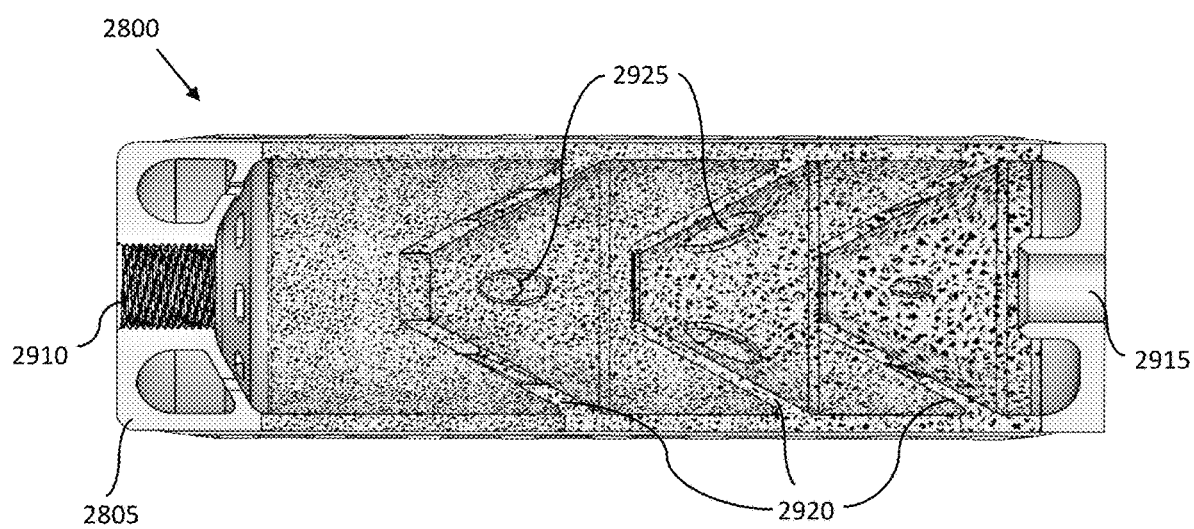
FIG. 29 is a longitudinal section view of a noise suppressor with porosity features, in accordance with the eleventh exemplary embodiment of the present invention.

FIGS. 28-34 are views of a monolithic noise suppressor with purposely induced porosity (PIP) features according to an eleventh exemplary embodiment of the present invention. FIG. 28 is a side view of a noise suppressor 2800 that includes spines and fins similar to that shown in the noise suppressor 2500 of FIG. 25. FIG. 29 is a section view of the noise suppressor 2800 of FIG. 28. However, the porosity of the body 2805 of the noise suppressor 2800 in FIGS. 28 and 29 is varied along the longitudinal direction of the noise suppressor 2800. Here, the drawing convention of dark speckles is used to represent pores in the material.

FIGS. 28 and 29 show that there can be no porosity features at both ends the noise suppressor 2800. The portions at the ends of a noise suppressor typically require the most structural support because of the strength needed at the features for attachment to a barrel or a first stage and at the end caps. FIGS. 28 and 29 show that the body 2805 and end cap portions do not include any PIP. FIG. 29 shows that there is no PIP in the attachment end that includes a threaded attachment feature 2910, initial blast chamber, and first (blast) baffle.

However, FIGS. 28 and 29 show that the porosity in the body 2805 gradually increases starting after the threaded attachment feature 2910 toward the exit portion of the bore 2915. The section view of FIG. 29 also shows baffles 2920 and bleed holes 2925 in the baffles 2920. As shown in FIG. 29, portions of the baffles 2920 also include substantially similar porosity as that of the portion of the body 2805 in which the baffle is correspondingly located.

Figure 30:
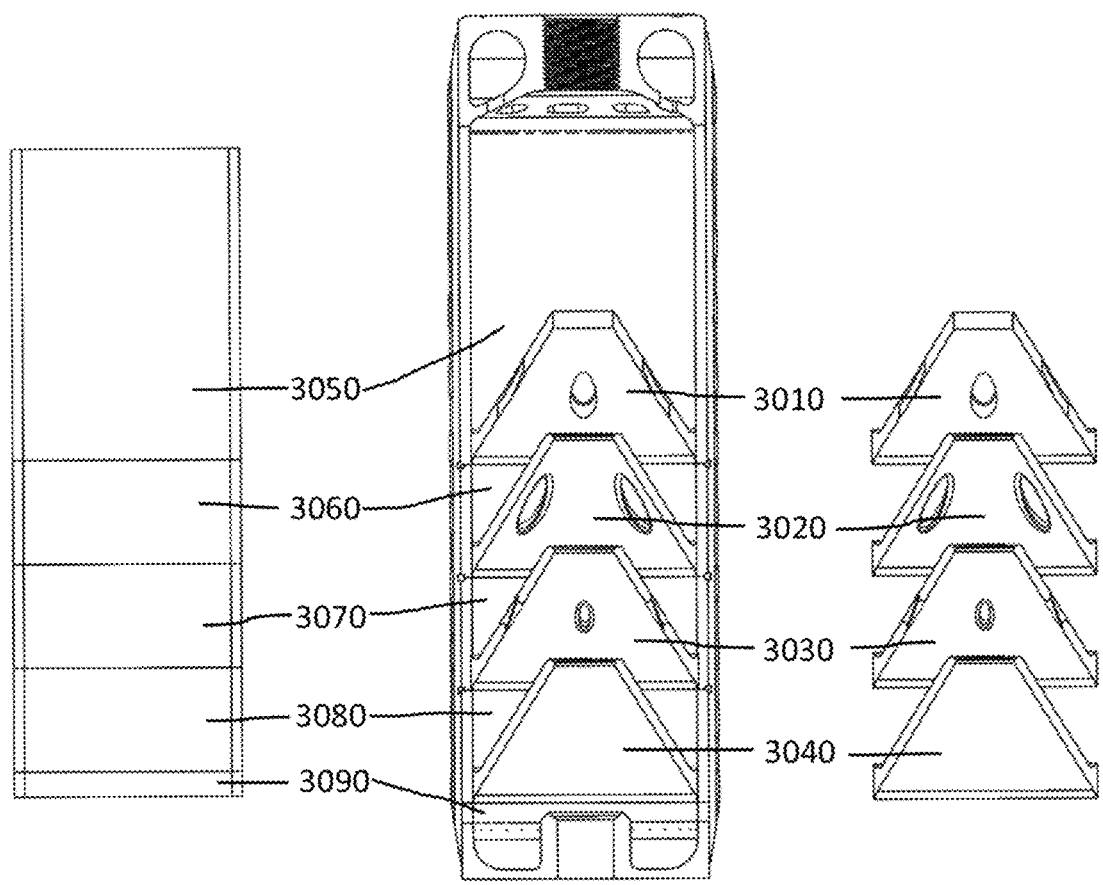
FIG. 30 shows representative views of a reference noise suppressor without porosity features.

Although many configurations are possible, FIGS. 31-34 provide examples of possible configurations of noise suppressors with PIP. FIG. 30 provides a reference image of a noise suppressor with no PIP. The center of FIG. 30 shows a section of a noise suppressor including baffles. The right portion of the figure represents just the baffles and the left portion of the figure represents just the body. The lines in the representation of the body are meant to delineate areas where the porosity changes, and are not different pieces or components. The right portion of FIG. 30 shows four baffles including a first baffle 3010, a second baffle 3020, a third baffle 3030, and a fourth baffle 3040. The left portion of FIG. 30 shows five sections of the noise suppressor body including a first body section 3050, a second body section 3060, a third body section 3070, a fourth body section 3080, and a fifth body section 3090. The features as shown in FIGS. 30-34 are extracted for description only as the noise suppressor is a single-piece monolithic structure. In FIGS. 31-34 the right half represents the noise suppressor body and the left half represents the baffles.

Figure 31:
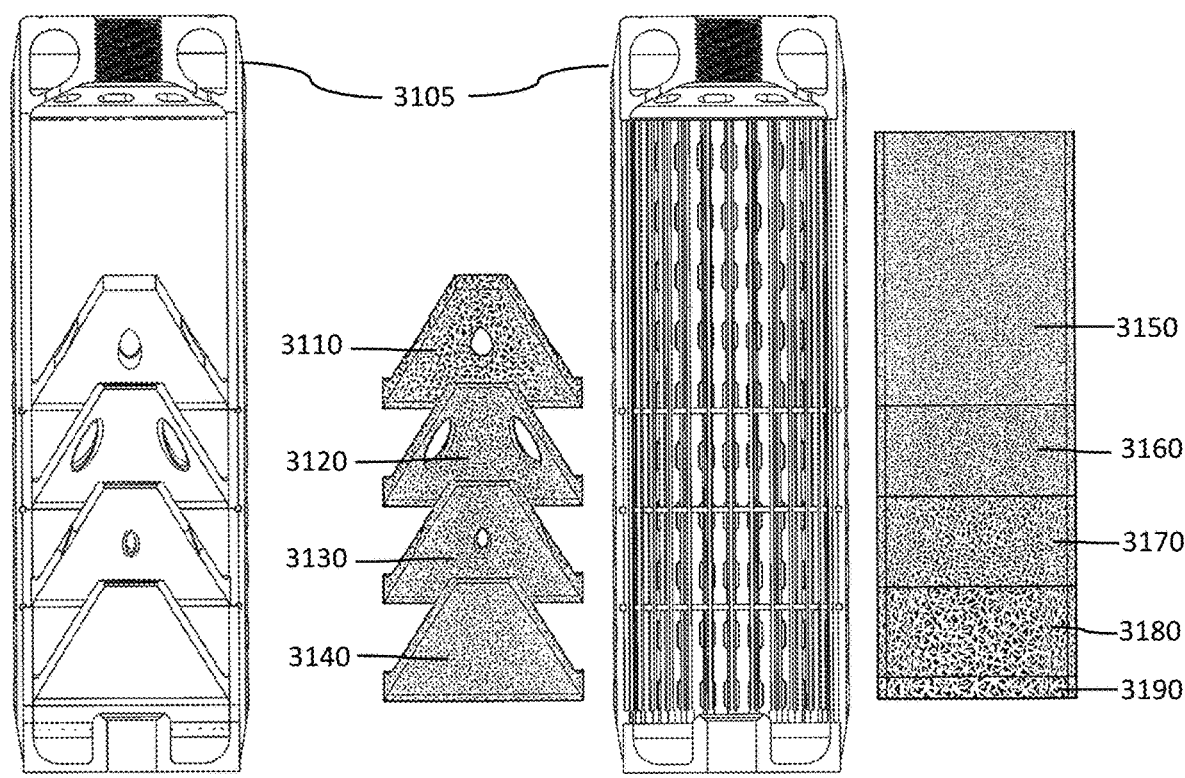
FIGS. 31, 32, 33, and 34 are representative views of noise suppressors with porosity features, in accordance with the eleventh exemplary embodiment of the present invention.

FIG. 31 shows one configuration of a noise suppressor with PIP according to an exemplary embodiment of the present invention where the porosity of the baffles decreases and the porosity of the sections of the body increases away from the attachment end 3105. FIG. 31 shows that the porosity of the first baffle 3110 closest to the attachment end 3105 of the noise suppressor is higher than that of the next closest second baffle 3120. The porosity of the second baffle 3120 is the same as that of the third baffle 3130, and is higher than that of the fourth baffle 3140. Conversely, the porosity of the first body section 3150 that is closest to the attachment end 3105 is the same as that of the next closest second body section 3160. The porosity of the second body section 3160 is lower than that of the third body section 3170, the porosity of the third body section 3170 is lower than that of the fourth body section 3180, and the porosity of the fourth body section 3180 is lower than that of the fifth body section 3190.

Figure 32:
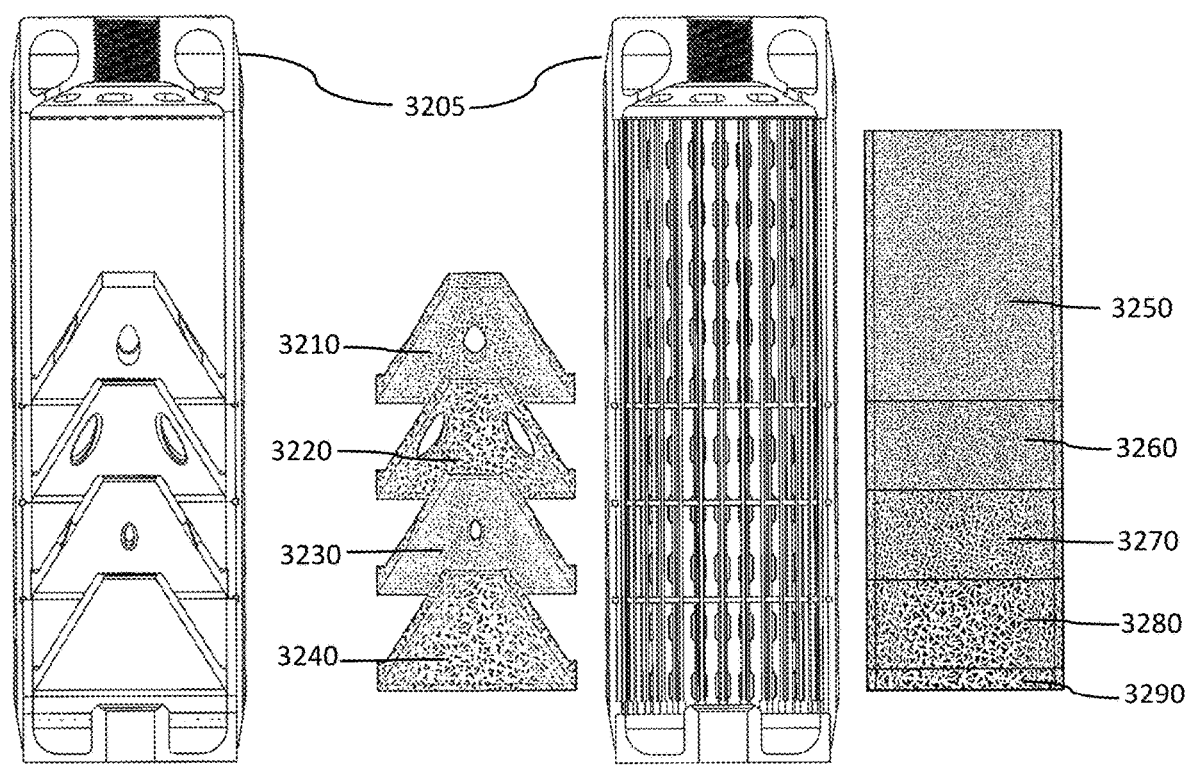

FIG. 32 shows another configuration of a noise suppressor with PIP according to an exemplary embodiment of the present invention where the porosities of the baffles are different from each other and the porosity of the sections of the body increases away from the attachment end 3205. FIG. 32 shows that the porosity of the first baffle 3210 closest to the attachment end 3205 of the noise suppressor is lower than that of the next closest second baffle 3220. The porosity of the second baffle 3220 is the same as that of the fourth baffle 3240, and higher than that of the third baffle 3230. As shown in FIG. 32, in order from lowest porosity to highest porosity, there is the third baffle 3230, the first baffle 3210, and the second baffle 3220 and the fourth baffle 3240. Similar to that described with respect to FIG. 31, the porosity of the first body section 3250 that is closest to the attachment end 3205 is lower than that of the next closest second body section 3260. In the same manner, the porosity of the second body section 3260 is lower than that of the third body section 3270, the porosity of the third body section 3270 is lower than that of the fourth body section 3280, and the porosity of the fourth body section 3280 is lower than that of the fifth body section 3290.

Figure 33:
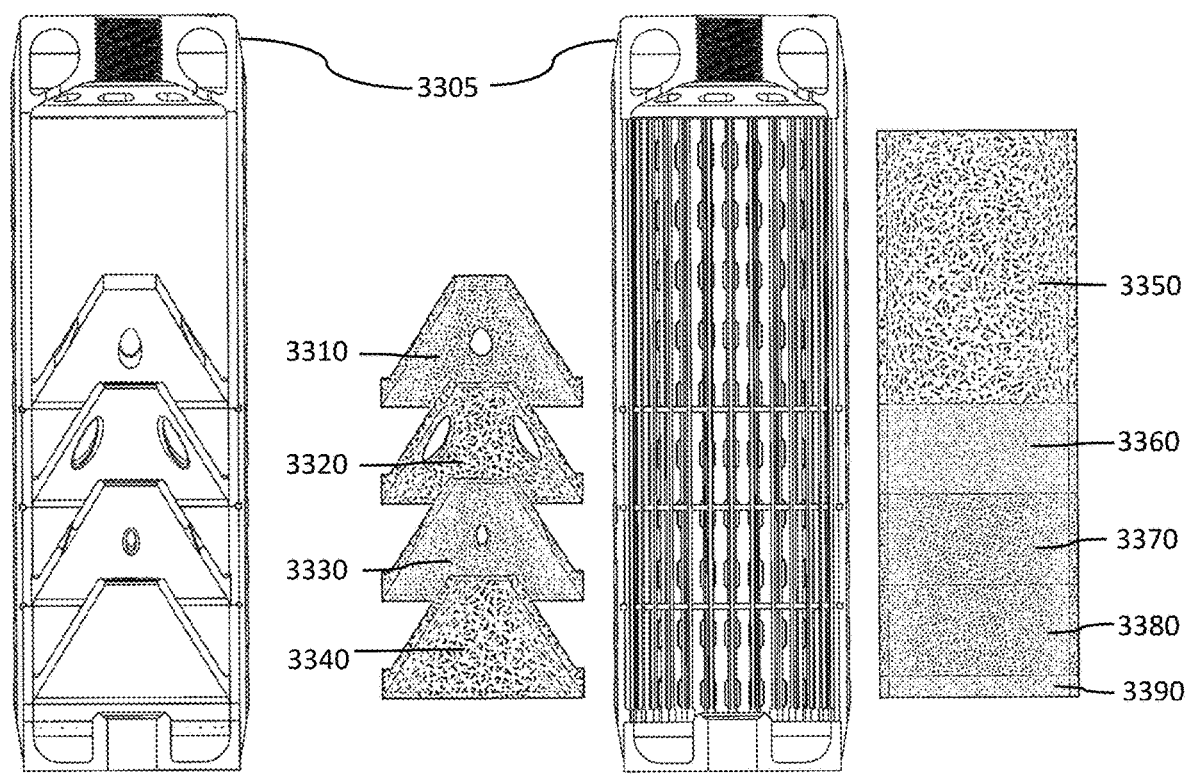

FIG. 33 shows another configuration of a noise suppressor with PIP according to an exemplary embodiment of the present invention where the porosity of the baffles and the sections of the body are different from each other. FIG. 33 shows that the porosity of the first baffle 3310 closest to the attachment end 3305 of the noise suppressor is lower than that of the next closest second baffle 3320. The porosity of the second baffle 3320 is the same as that of the fourth baffle 3340 and higher than that of the third baffle 3330. As shown in FIG. 33, in order from lowest porosity to highest porosity there is the third baffle 3330, the first baffle 3310, and the fourth baffle 3340 and the second baffle 3220. FIG. 33 also shows that the porosity of the first body section 3350 that is closest to the attachment end 3205 is higher than that of the next closest second body section 3360. The porosity of the second body section 3360 is lower than that of the third body section 3370, which is the same as the porosity of the fourth body section 3380. The porosity of the second body section 3360 is the same as that of the fifth body section 3390.

Figure 34:
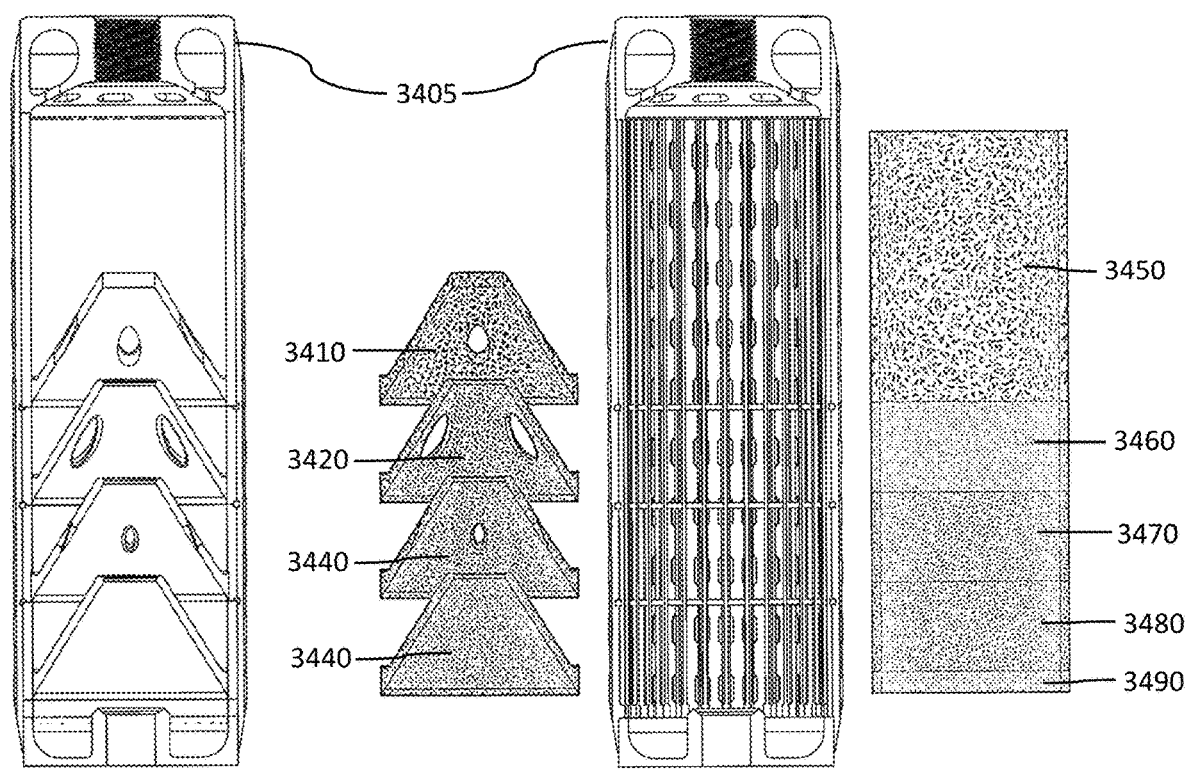

FIG. 34 shows another configuration of a noise suppressor with PIP according to an exemplary embodiment of the present invention where the porosity of the baffles and the sections of the body are different from each other. FIG. 34 shows that the porosity of the first baffle 3410 closest to the attachment end 3405 of the noise suppressor is lower than that of the next closest second baffle 3420. The porosity of the second baffle 3420 is the same as that of the third baffle 3430 and of the fourth baffle 3440. FIG. 34 also shows that the porosity of the first body section 3450 that is closest to the attachment end 3405 is higher than that of the next closest second body section 3460. The porosity of the second body section 3460 is lower than that of the third body section 3470, which is the same as the porosity of the fourth body section 3480. The porosity of the second body section 3460 is the same as that of the fifth body section 3490.

The present invention has been described in terms of exemplary embodiments. It will be understood that the certain modifications and variations of the various features described above with respect to these exemplary embodiments are possible without departing from the spirit of the invention.

What is claimed is:

1. A noise suppression device for use with a firearm, the noise suppression device comprising:
a body including an outermost external surface of the noise suppression device, an internal portion, a first end, and a second end; and
a core seamlessly connected to the internal portion of the body, wherein
the noise suppression device includes no joints, no seams, or any formerly separate pieces within the body or the core, and
a porosity of a first portion of the body that is adjacent to the first end is different from a porosity of a second portion of the body that is adjacent to the second end, wherein
the porosity is a fraction of a volume of pores per volume of mass in a material of the noise suppression device.

2. The noise suppression device of claim 1, wherein a porosity of the body increases between the second end and the first end.

3. The noise suppression device of claim 1, wherein a porosity of the first end and a porosity of the second end are less than the porosity of the first portion of the body and the porosity of the second portion of the body.

4. The noise suppression device of claim 1, further comprising a baffle, wherein a porosity of the baffle is a same porosity as a portion of the body directly adjacent to the baffle.

5. The noise suppression device of claim 4, wherein the baffle includes a bleed hole.

6. The noise suppression device of claim 1, wherein the noise suppression device is made of a plastic.

7. The noise suppression device of claim 1, wherein the noise suppression device is made of a metal or a metal alloy.

8. The noise suppression device of claim 1, wherein the noise suppression device is a three-dimensional-printed structure.

9. A noise suppression device for use with a firearm, the noise suppression device comprising:
a body including an outermost external surface of the noise suppression device, an internal portion, a first end, and a second end; and
a core seamlessly connected to the internal portion of the body, wherein
the noise suppression device includes no joints, no seams, or any formerly separate pieces within the body or the core,
the core includes a plurality of baffles that separate a plurality of chambers, and
a porosity of a first baffle of the plurality of baffles that is adjacent to the first end is different from a porosity of a second baffle of the plurality of baffles that is adjacent to the second end, wherein
the porosity is a fraction of a volume of pores per volume of mass in a material of the noise suppression device.

10. The noise suppression device of claim 9, wherein a porosity of a first portion of the body that is adjacent to the first end is greater than a porosity of a second portion of the body that is adjacent to the second end.

11. The noise suppression device of claim 9, wherein a porosity of a first portion of the body that is adjacent to the first end is less than a porosity of a second portion of the body that is adjacent to the second end.

12. The noise suppression device of claim 9, wherein a porosity of a first portion of the body that is adjacent to the first end, a porosity of a second portion of the body that is adjacent to the second end, and a porosity of a third portion of the body that is between the first portion and the second portion of the body are different from each other.

13. The noise suppression device of claim 12, wherein the porosity of the first baffle, the porosity of the second baffle, and a porosity of a third baffle of the plurality of baffles are different from each other.

14. The noise suppression device of claim 9, wherein the porosity of the first baffle, the porosity of the second baffle, and a porosity of a third baffle of the plurality of baffles are different from each other.

15. The noise suppression device of claim 9, wherein the noise suppression device is made of a metal or a metal alloy.

16. The noise suppression device of claim 9, wherein the noise suppression device is made of a plastic.

17. The noise suppression device of claim 9, wherein the noise suppression device is a three-dimensional-printed structure.

\* \* \* \* \*